(12) United States Patent
Douceur et al.

(10) Patent No.: US 8,903,705 B2
(45) Date of Patent: Dec. 2, 2014

(54) APPLICATION COMPATIBILITY SHIMS FOR MINIMAL CLIENT COMPUTERS

(75) Inventors: John R. Douceur, Bellevue, WA (US); Jonathan R. Howell, Seattle, WA (US); Arun M. Seehra, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 12/972,081

(22) Filed: Dec. 17, 2010

(65) Prior Publication Data
US 2012/0158396 A1 Jun. 21, 2012

(51) Int. Cl.
*G06F 9/455* (2006.01)
(52) U.S. Cl.
CPC ................ *G06F 9/4555* (2013.01)
USPC ............. 703/27; 709/203; 709/219; 709/231; 718/1
(58) Field of Classification Search
CPC ........ G06F 17/30861–17/30876; G06F 9/455; G06F 2009/455; G06F 2009/45533; G06F 2009/45562; G06F 2009/45587; G06F 9/45584; G06F 21/53; G06F 9/54
USPC .......................................................... 703/23
See application file for complete search history.

(56) References Cited

U.S. PATENT DOCUMENTS

| | | | |
|---|---|---|---|
| 4,874,164 A | 10/1989 | Miner et al. | |
| 5,754,830 A * | 5/1998 | Butts et al. | 719/311 |
| 5,815,686 A | 9/1998 | Earl et al. | |
| 5,819,091 A | 10/1998 | Arendt et al. | |
| 5,926,631 A * | 7/1999 | McGarvey | 703/23 |
| 6,357,003 B1 | 3/2002 | Zarrin et al. | |
| 6,665,731 B1 | 12/2003 | Kumar et al. | |
| 6,668,376 B1 | 12/2003 | Wang et al. | |
| 6,813,670 B1 | 11/2004 | Yao et al. | |
| 6,874,066 B2 | 3/2005 | Traversat et al. | |
| 6,876,996 B2 | 4/2005 | Czajkowski et al. | |
| 7,028,308 B2 | 4/2006 | Kim | |
| 7,287,259 B2 | 10/2007 | Grier et al. | |

(Continued)

FOREIGN PATENT DOCUMENTS

WO WO2008111049 A2 9/2008

OTHER PUBLICATIONS

Wang et al, "Protection and Communication Abstractions for Web Browsers in MashupOS", SOSP'07, Oct. 14-17, 2007.*

(Continued)

*Primary Examiner* — Mary C Jacob
(74) *Attorney, Agent, or Firm* — Steve Wight; Judy Yee; Micky Minhas

(57) ABSTRACT

This document describes techniques for allowing a computing device that provides a minimal execution environment to execute legacy applications that rely on rich functionality that the computing device does not natively provide. For instance, a device may initially receive a request to execute an application and may determine whether the application is directly executable. In response to determining that the application is not directly executable, the computing device may determine whether the application specifies another application to provide the functionality. If the application specifies another application to provide this functionality, then the computing device retrieves the specified application and executes the specified application on the client computing device. If the application does not specify such an application, then the computing device may execute a default application for providing the functionality. The specified or default application then executes the application that is not directly executable on the minimal-execution-environment computing device.

20 Claims, 11 Drawing Sheets

(56) References Cited

U.S. PATENT DOCUMENTS

| | | | |
|---|---|---|---|
| 7,334,122 B2 | 2/2008 | Burokas et al. | |
| 7,444,337 B2 | 10/2008 | Zhou et al. | |
| 7,496,495 B2 | 2/2009 | Solomon et al. | |
| 7,502,823 B2 | 3/2009 | Garg et al. | |
| 7,574,709 B2 | 8/2009 | Erlingsson et al. | |
| 7,596,783 B2 | 9/2009 | Huang et al. | |
| 7,613,862 B2 | 11/2009 | Mihai | |
| 7,627,728 B1 | 12/2009 | Roeck et al. | |
| 7,676,538 B2 | 3/2010 | Potter et al. | |
| 7,685,593 B2 | 3/2010 | Solomon et al. | |
| 7,703,081 B1 | 4/2010 | Buches | |
| 7,703,083 B2 | 4/2010 | Shi et al. | |
| 7,769,720 B2 | 8/2010 | Armington | |
| 7,774,762 B2* | 8/2010 | Rochette et al. | 717/138 |
| 7,788,669 B2 | 8/2010 | England et al. | |
| 7,844,442 B2 | 11/2010 | Tzruya | |
| 7,870,153 B2* | 1/2011 | Croft et al. | 707/781 |
| 7,886,183 B2 | 2/2011 | Krishnan et al. | |
| 7,913,252 B2* | 3/2011 | Shlomai | 718/1 |
| 7,937,612 B1 | 5/2011 | Lyadvinsky et al. | |
| 8,019,861 B2 | 9/2011 | Ginzton | |
| 8,117,554 B1* | 2/2012 | Grechishkin et al. | 715/764 |
| 8,150,971 B2 | 4/2012 | Lublin et al. | |
| 8,195,774 B2 | 6/2012 | Lambeth et al. | |
| 8,285,987 B1 | 10/2012 | Kimball et al. | |
| 8,424,082 B2* | 4/2013 | Chen et al. | 726/21 |
| 8,505,029 B1* | 8/2013 | Chanda et al. | 719/313 |
| 2003/0208595 A1 | 11/2003 | Gouge et al. | |
| 2004/0015537 A1 | 1/2004 | Doerksen et al. | |
| 2004/0168030 A1 | 8/2004 | Traversat et al. | |
| 2004/0177243 A1 | 9/2004 | Worley, Jr. | |
| 2005/0076186 A1 | 4/2005 | Traut | |
| 2005/0080936 A1 | 4/2005 | Ray et al. | |
| 2005/0177635 A1 | 8/2005 | Schmidt et al. | |
| 2005/0187894 A1 | 8/2005 | Pletcher et al. | |
| 2006/0005047 A1 | 1/2006 | Lekatsas et al. | |
| 2006/0161563 A1 | 7/2006 | Besbris et al. | |
| 2006/0161982 A1 | 7/2006 | Chari et al. | |
| 2006/0184931 A1 | 8/2006 | Rochette et al. | |
| 2006/0248208 A1 | 11/2006 | Walbeck et al. | |
| 2007/0061556 A1 | 3/2007 | Rothman et al. | |
| 2007/0074191 A1* | 3/2007 | Geisinger | 717/148 |
| 2007/0134068 A1 | 6/2007 | Smith et al. | |
| 2007/0136579 A1 | 6/2007 | Levy et al. | |
| 2007/0136723 A1 | 6/2007 | Smith et al. | |
| 2007/0169116 A1 | 7/2007 | Gujarathi et al. | |
| 2007/0244980 A1 | 10/2007 | Baker, III et al. | |
| 2007/0250838 A1 | 10/2007 | Belady et al. | |
| 2007/0283324 A1 | 12/2007 | Geisinger | |
| 2008/0005472 A1 | 1/2008 | Khalidi et al. | |
| 2008/0005794 A1 | 1/2008 | Inoue et al. | |
| 2008/0028401 A1 | 1/2008 | Geisinger | |
| 2008/0127182 A1 | 5/2008 | Newport et al. | |
| 2008/0127225 A1 | 5/2008 | Mullis, et al. | |
| 2008/0263531 A1 | 10/2008 | Perry et al. | |
| 2008/0276012 A1 | 11/2008 | Mesa et al. | |
| 2009/0024757 A1 | 1/2009 | Proctor | |
| 2009/0064196 A1 | 3/2009 | Richardson et al. | |
| 2009/0210871 A1 | 8/2009 | Dechovich | |
| 2009/0222304 A1 | 9/2009 | Higgins et al. | |
| 2009/0259993 A1 | 10/2009 | Konduri et al. | |
| 2009/0265706 A1 | 10/2009 | Golosovker et al. | |
| 2009/0282404 A1 | 11/2009 | Khandekar et al. | |
| 2009/0282474 A1 | 11/2009 | Chen et al. | |
| 2009/0307781 A1 | 12/2009 | Iga et al. | |
| 2009/0328225 A1 | 12/2009 | Chambers et al. | |
| 2010/0017461 A1 | 1/2010 | Kokkevis et al. | |
| 2010/0017857 A1 | 1/2010 | Kramer | |
| 2010/0023700 A1 | 1/2010 | Chen et al. | |
| 2010/0031276 A1 | 2/2010 | Hsieh | |
| 2010/0042636 A1 | 2/2010 | Lu | |
| 2010/0042796 A1 | 2/2010 | Vasilevsky et al. | |
| 2010/0042987 A1 | 2/2010 | Yamada | |
| 2010/0082926 A1 | 4/2010 | Sahita et al. | |
| 2010/0115334 A1 | 5/2010 | Malleck et al. | |
| 2010/0153659 A1 | 6/2010 | Lovell et al. | |
| 2010/0158220 A1 | 6/2010 | Silverman | |
| 2010/0169497 A1 | 7/2010 | Klimentiev et al. | |
| 2010/0174833 A1 | 7/2010 | Filer et al. | |
| 2010/0180275 A1 | 7/2010 | Neogi et al. | |
| 2010/0185956 A1 | 7/2010 | Anantharaman et al. | |
| 2010/0211663 A1 | 8/2010 | Barboy et al. | |
| 2010/0211956 A1 | 8/2010 | Gopisetty et al. | |
| 2010/0262853 A1 | 10/2010 | Goda | |
| 2010/0262977 A1 | 10/2010 | Havemose | |
| 2010/0287263 A1 | 11/2010 | Liu et al. | |
| 2010/0287548 A1 | 11/2010 | Zhou et al. | |
| 2010/0287618 A1 | 11/2010 | Howell et al. | |
| 2010/0332629 A1* | 12/2010 | Cotugno et al. | 709/221 |
| 2011/0004878 A1* | 1/2011 | Divoux | 718/1 |
| 2011/0047376 A1 | 2/2011 | Mittal | |
| 2011/0119494 A1 | 5/2011 | Huang et al. | |
| 2011/0162082 A1 | 6/2011 | Paksoy et al. | |
| 2011/0191494 A1 | 8/2011 | Turanyi et al. | |
| 2011/0231670 A1 | 9/2011 | Shevchenko et al. | |
| 2011/0246551 A1 | 10/2011 | Giancaspro et al. | |
| 2011/0257992 A1 | 10/2011 | Scantland et al. | |
| 2011/0264788 A1 | 10/2011 | Costa | |
| 2011/0296487 A1 | 12/2011 | Walsh | |
| 2011/0302330 A1 | 12/2011 | Cota-Robles et al. | |
| 2011/0320520 A1 | 12/2011 | Jain | |
| 2012/0005192 A1 | 1/2012 | Bao et al. | |
| 2012/0017213 A1 | 1/2012 | Hunt et al. | |
| 2012/0036255 A1 | 2/2012 | Polsky | |
| 2012/0036509 A1 | 2/2012 | Srinivasan et al. | |
| 2012/0144042 A1 | 6/2012 | Lublin et al. | |
| 2012/0222025 A1 | 8/2012 | Pandit | |
| 2012/0265742 A1 | 10/2012 | Burckhardt et al. | |
| 2012/0291094 A9 | 11/2012 | Forrester et al. | |
| 2012/0296626 A1 | 11/2012 | Bond et al. | |
| 2013/0031371 A1 | 1/2013 | McLellan et al. | |
| 2013/0060947 A1 | 3/2013 | Nelson | |

OTHER PUBLICATIONS

Yee et al, "Native Client: A Sandbox for Portable, Untrusted x86 Native Code", 30th IEEE Symposium on Security and Privacy, 2009.*

Yu et al, "A Feather-weight Virtual Machine for Windows Applications", VEE'06, Jun. 14-16, 2006.*

"Aquifer Application Services Platform Version 5.5", retrieved on Mar. 3, 2009 at <<http://www.sysmanagement.com/enterpriseProducts/overview.aspx>>, Systems Management Engineering 2003, 2 pages.

"Browser Swallows OS", retrieved on Mar. 3, 2009 at <<http://www.desktoplinux.com/news/NS2750645189.html>>, Ziff Davis Enterprise Holdings Inc., Dec. 1, 2008, 3 pages.

Chen, "Native Client: A Technology for Running Native Code on the Web", retrieved on Mar. 3, 2009 at <<http://google-code-updates.blogspot.com/2008/12/native-client-technology-for-running.html>>, Google Code Blog, Dec. 8, 2008, 21 pages.

Chernoff, et al., "DIGITAL FX!32 Running 32-Bit x86 Applications on Alpha NT", retrieved on Mar. 3, 2009 at <<http://citeseerx.ist.psu.edu/viewdoc/summary?doi=10.1.1.21.8607>>, Proceedings of the USENIX Windows NT Workshop, Seattle, WA., Aug. 1997, 8 pages.

Chiueh, et al., "Integrating Segmentation and Paging Protection for Safe, Efficient and Transparents Software Extensions", retrieved on Mar. 3, 2009 at <<http://www.sigops.org/sosp99/slides/kernel/chiueh.ps>>, Computer Science Dept., State University of New York, NY., 22 pages.

Clark, et al., "Live Migration of Virtual Machines", retrieved on Mar. 3, 2009 at <<http://www.cl.cam.ac.uk/research/srg/netos/papers/2005-migration-nsdi-pre.pdf>>, 14 pages.

"CLOC Count Lines of Code", retrieved on Mar. 3, 2009 at <<http://cloc.sourceforge.net/>>, Northrop Grummam Corporation / Information Technology / IT Solutions, 2006-2009, 15 pages.

Condit, et al., "Beta-Diversity in Tropical Forest Trees", retrieved on Mar. 3, 2009 at <<http://students.washington.edu/timbillo/readings%20for%20peru/Condit%20et%20al.%20Science%202008%20beta%20diversity%20of%20tropical%20trees.pdf>>, Science 295, pp. 666-669, (2002).

(56) References Cited

OTHER PUBLICATIONS

Cox, et al., "A Safety-Oriented Platform for Web Applications", retrieved on Mar. 3, 2009 at <<http://www.cs.washington.edu/homes/gribble/papers/gribble-Tahoma.pdf>>, 15 pages.
"CVE-2003-0111", retrieved on Mar. 3, 2009 at <<http://cve.mitre.org/cgi-bin/cvename.cgi?name=CAN-2003-0111>>, Common Vulnerabilities and Exposures website, 2009, 1 page.
"CVE-2007-0043", retrieved on Mar. 3, 2009 at <<http://cve.mitre.org/cgi-bin/cvename.cgi?name=CVE-2007-0043>>, Common Vulnerabilities and Exposures website, 2009, 1 page.
"Debian Counting", retrieved on Mar. 3, 2009 at <<http://libresoft.dat.escet.urjc.es/debian-counting/>>, Grupo de Sistemas y Comunicaciones, Universidad Rey Juan Carlos, Mostoles, Madrid, Spain, 2004-2005, 1 page.
Microsoft—TechNet, Device Management and Installation Step-by-Step Guide, retrieved on Apr. 14, 2011 at <<http://technet.microsoft.com/en-us/library/dd919230%28WS.10%29.aspx>>, 2 pages.
Erlingsson, et al., "XFI: Software Guards for System Address Spaces", retrieved on Mar. 3, 2009 at <<http://www.cs.ucsd.edu/~mvrable/papers/2006-osdi-xfi.pdf>>, Microsoft Research, Silicon Valley, pp. 1-14.
Ford, et al., "Vx32: Lightweight, User-level Sandboxing on the x86", retrieved on Mar. 3, 2009 at <<http://pdos.csail.mit.edu/papers/vx32:usenix08/>>, Massachusetts Institute of Technology, 20 pages.
Ford, et al., "VXA: A Virtual Architecture for Durable Compressed Archives", retrieved on Mar. 3, 2009 at <<http://pdos.csail.mit.edu/papers/vxa:fast05.pdf>>, Computer Science and Artificial Intelligence Laboratory, MIT, Mass., 14 pages.
Garfinkel, et al., "Ostia: A Delegating Architecture for Secure System Call Interposition", retrieved on Mar. 3, 2009 at <<http://www.isoc.org/isoc/conferences/ndss/04/proceedings/Papers/Garfinkel.pdf>>, Computer Science Department, Stanford University, CA., 15 pages.
Garfinkel, "Traps and Pitfalls: Practical Problems in System Call Interposition Based Security Tools", retrieved on Mar. 3, 2009 at <<http://www.stanford.edu/~talg/papers/traps/traps-ndss03.pdf>>, Computer Science Department, Stanford University, 14 pages.
Goldberg, et al., "A Secure Environment for Untrusted Helper Applications (Confining the Wily Hacker)", retrieved on Mar. 3, 2009 at <<http://www.usenix.org/publications/library/proceedings/sec96/full_papers/goldberg/goldberg.pdf>>, Proceedings of the Sixth USENIX UNIX Security Symposium, San Jose, CA., Jul. 1996, 14 pages.
"Gears Improving Your Web Browser", retrieved on Mar. 3, 2009 at << http://gears.google.com/>>, Google 2008, 1 page.
Harren, et al., "Using Dependent Types to Certify the Safety of Assembly Code", retrieved on Mar. 3, 2009 at <<http://www.cs.berkeley.edu/~necula/Papers/deptypes_sas05.pdf>>, Static Analysis Symposium (SAS) 2005, pp. 155-170.
"iKernel: Isolating Buggy and Malicious Device Drivers Using . . . ", SlideShare, Inc., retrieved on Aug. 4, 2011 at <<http://www.slideshare.net/Cameroon45/ikernel-isolating-buggy-and-malicious-device-drivers-using>>, 7 pages.
Jackson, et al., "Protecting Browser State from Web Privacy Attacks", retrieved on Mar. 3, 2009 at <<http://portal.acm.org/citation.cfm?id=1135884>>, WWW 2006, May 23-26, 2006, Edinburgh, Scotland, pp. 737-744.
Jobs, "Keynote Address", Apple Worldwide Developers Conference, Aug. 2006, 3 pages.
Kiciman, et al., "AjaxScope: A Platform for Remotely Monitoring the Client-Side Behavior of Web 2.0 Applications", retrieved on Mar. 3, 2009 at <<http://research.microsoft.com/en-us/projects/ajaxview/ajaxscope-sosp.pdf>>, SOSP 2007, Oct. 14-17, 2007, Stevenson, WA., 14 pages.
Kozuch, et al., "Internet Suspend/Resume", retrieved on Mar. 3, 2009 at <<http://www.intel-research.net/Publications/Pittsburgh/110620030912_88.pdf>>, Fourth IEEE Workshop on Mobile Computing Systems and Applications, Callicoon, NY, Jun. 2002, 8 pages.
"Live from CES: Hands on With Vista—Vista by the Numbers, A Developer Tells All", retrieved on Mar. 3, 2009 at <<http://ces.gearlive.com/cesblog/article/live-from-ces-hands-on-with-vistamdashvista-by-the-numbers-0108051321/>>, 5 pages.
Livshits, et al., "Doloto: Code Splitting for Network-Bound Web 2.0 Applications", retrieved on Mar. 3, 2009 at <<ftp://ftp.research.microsoft.com/pub/tr/TR-2007-159.pdf>>, Microsoft Research, pp. 1-25.
Lorch, et al., "The VTrace Tool: Building a System Tracer for Windows NT and Windows 2000", retrieved on Mar. 3, 2009 at <<http://msdn.microsoft.com/en-us/magazine/cc302289(printer).aspx>>, Microsoft Corporation 2009, 10 pages.
OSdata.com, "Maintenance and Administration," retrieved on Apr. 14, 2011 at <<http://www.osdata.com/holistic/maintain/maintain.htm>>, 8 pages.
McCamant, et al., "Evaluating SFI for a CISC Architecture", retrieved on Mar. 3, 2009 at <<http://groups.csail.mit.edu/pag/pubs/pittsfield-usenix2006.pdf>>, pp. 1-16.
McIlroy, "Mass Produced Software Components", retrieved on Mar. 3, 2009 at <<http://www.dcs.gla.ac.uk/courses/teaching/mscweb/rrcs/papers/SE/McIlroy.pdf >>, 12 pages.
Morrisett, et al., "From System F to Typed Assembly Language", retrieved on Mar. 3, 2009 at <<http://www.cs.princeton.edu/~dpw/papers/tal-toplas.pdf>>, Mar. 1999, pp. 1-41.
"Mozilla: The browser as operating system", retrieved on Mar. 3, 2009 at <<http://www.mathewingram.com/work/2008/08/26/mozilla-the-browser-as-operating-system/>>, Aug. 26, 2008, 8 pages.
Necula, et al., "CCured: Type-Safe Retrofitting of Legacy Software", retrieved on Mar. 3, 2009 at <<http://www.eecs.berkeley.edu/~necula/Papers/ccured_toplas.pdf>>, ACM Transactions on Programming Languages and Systems, vol. 27, No. 3, May 2005, 48 pages.
Necula, et al., "Safe Kernel Extensions Without Run-Time Checking", retrieved on Mar. 3, 2009 at <<http://citeseerx.ist.psu.edu/viewdoc/summary?doi=10.1.1.40.3010>>, Proceedings of the Second Symposium on Operating Systems Design and Implementation (OSDI 1996), Seattle, WA., Oct. 28-31, 1996, 15 pages.
"CWE—Common Weakness Enumeration", retrieved on Mar. 3, 2009 at <<http://nvd.nist.gov/cwe.cfm>>, National Vulnerability Database, NIST, 3 pages.
"Outsource Web Enabling your Legacy Applications to O2I", retrieved on Mar. 3, 2009 at <<http://www.outsource2india.com/software/LegacySystems.asp>>, Flatworld Solutions Company, 2008, 7 pages.
Provos, "Improving Host Security with System Call Policies", retrieved on Mar. 3, 2009 at <<http://www.citi.umich.edu/u/provos/papers/systrace.pdf>>, Center for Information Technology Integration, University of Michigan, 15 pages.
Puder, "Extending Desktop Applications to the Web", retrieved on Mar. 3, 2009 at <<http://www.puder.org/publications/dorea04.pdf>>, San Francisco State University, Computer Science Department, 6 pages.
Purdy, et al., "Google Chrome as Future Operating System", retrieved on Mar. 3, 2009 at <<http://lifehacker.com/5053069/google-chrome-as-future-operating-system>>, Sep. 22, 2008, 1 page.
Resig, "The Browser Operating System", retrieved on Mar. 3, 2009 at <<http://ejohn.org/blog/the-browser-operating-system/>>, Feb. 22, 2009, 5 pages.
Rinard, et al., "Enhancing Server Availability and Security Through Failure-Oblivious Computing", retrieved on Mar. 3, 2009 at <<http://web.mit.edu/droy/www/papers/osdi04.pdf>>, Computer Science and Artificial Intelligence Laboratory, MIT, Mass., 14 pages.
Sabin, "Strace for NT", retrieved on Mar. 3, 2009 at <<http://www.securityfocus.com/tools/1276>>, SecurityFocus 2007, 1 page.
Sapuntzakis, et al., "Optimizing the Migration of Virtual Computers", retrieved on Mar. 3, 2009 at <<http://suif.stanford.edu/collective/osdi02-optimize-migrate-computer.pdf>>, Computer Science Department, Stanford University, 14 pages.
"Secunia Advisories: SA7587", retrieved on Mar. 3, 2009 at <<http://secunia.com/advisories/7587/>>, Secunia 2002-2009, 4 pages.
"Open Source Software", retrieved on Mar. 3, 2009 at <<http://sourceforge.net>>, SourceForge, Inc., 1999-2009, 1 page.

(56) References Cited

OTHER PUBLICATIONS

Stokely, "The FreeBSD Handbook", 3rd Edition, vol. 1: User's Guide, FreeBSD Mall, Inc., Brentwood, CA., 2003, 408 pgs.
Swift, et al., "Improving the Reliability of Commodity Operating Systems", retrieved on Mar. 3, 2009 at <<http://nooks.cs.washington.edu/nooks-tocs.pdf>>, University of Washington, pp. 1-33.
"The Dojo Offline Toolkit", retrieved on Mar. 3, 2009 at <<http://dojotoolkit.org/offline>>, The Dojo Foundation, 3 pages.
Tridgell, "Efficient Algorithms for Sorting and Synchronization", retrieved on Mar. 3, 2009 at <<http://www.samba.org/~tridge/phd_thesis.pdf>>, Australian National University, Feb. 1999, 115 pages.
Tucker, et al., "Solaris Zones: Operating System Support for Server Consolidation", retrieved on Mar. 3, 2009 at <<http://www.usenix.org/events/vm04/wips/tucker.pdf>>, Sun Microsystems, Inc., 2 pages.
"User-Mode Driver Framework (UMDF)", Microsoft Windows, retrieved on Aug. 4, 2011 at <<http://msdn.microsoft.com/en-us/windows/hardware/gg463294.aspx>>, 1 page.
Wahbe, et al., "Efficient Software-Based Fault Isolation", retrieved on Mar. 3, 2009 at <<http://crypto.stanford.edu/cs155/papers/sfi.pdf>>, SIGOPS 1993/12/93/N.C., USA, pp. 203-216.
Waldspurger, "Memory Resource Management in VMware ESX Server", retrieved on Mar. 3, 2009 at <<http://www.waldspurger.org/carl/papers/esx-mem-osdi02.pdf>>, Proc. Fifth Symposium on Operating Systems Design and Implementation (OSDI 2002), Dec. 2002, pp. 1-14.
"What is JPC?", retrieved on Mar. 3, 2009 at <<http://www-jpc.physics.ox.ac.uk/>>, Oxford University, 2004-2007, 2 pages.
Whitaker, et al., "Danali: Lightweight Virtual Machines for Distributed and Networked Applications", retrieved on Mar. 3, 2009 at <<http://denali.cs.washington.edu/pubs/distpubs/papers/denali_usenix2002.pdf>>, University of Washington, 14 pages.
"Windows Driver Kit", retrieved on Mar. 3, 2009 at <<http://microsoft.com/whdc/devtools/wdk/default.mspx>>, Microsoft Corporation 2009, 2 pages.
"Windows User Mode Driver Framework", From Wikipedia, the free encyclopedia, Retrieved on Aug. 4, 2011 at <<http://en.wikipedia.org/wiki/User-Mode_Driver_Framework>>, 2 pages.
"WineHQ", retrieved on Mar. 3, 2009 at <<http://www.winehq.org/>>, 3 pages.
Witchel, et al., "Mondrix: Memory Isolation for Linux using Mondriaan Memory Protection", retrieved on Mar. 3, 2009 at <<http://www.cag.lcs.mit.edu/scale/papers/mmp-sosp2005.pdf>>, SOSP 2005, Oct. 23-26, 2005, Brighton, UK, 14 pages.
Haff, "RingCube brings 'containers' to the client", retrieved on Oct. 11, 2010 at <<http://news.cnet.com/8301-13556_3-10158247-61.html>>, CNET News, Feb. 6 2009, pp. 1-3.
Piotrowski, et al., "Virtics: A System for Privilege Separation of Legacy Desktop Applications", retrieved on Oct. 11, 2010 at <<http://www.eecs.berkeley.edu/Pubs/TechRpts/2010/EECS-2010-70.pdf>>, EECS Department, University of California at Berkeley, Technical Report No. UCB/EECS-2010-70, May 13, 2010, pp. 1-21.
"Sun Ray Ultra-Thin Clients in Technical Computing", retrieved on Oct. 11, 2010 at <<http://www.sun-rays.org/lib/hardware/sunray/ds/sunray_tc.pdf>>, Sun Microsystems, Inc., Datasheet, 2003, pp. 1-2.
Zhang, et al., "A CORBA Trader-based Dynamic Binding Infrastructure in Pervasive Computing", retrieved on Oct. 11, 2010 at <<http://ieeexplore.ieee.org/stamp/stamp.jsp?tp=&arnumber=4079032>>, International Symposium on Pervasive Computing and Applications, 2006, pp. 12-16.
Office Action for U.S. Appl. No. 12/463,892, mailed on Dec. 6, 2011, Jonathan R. Howell, "Executing Native-Code Applications in a Browser", 21 pgs.
"Amazon Elastic Compute Cloud (EC2)", maluke.com, accessible from http://www.maluke.com/blog/amazon-elastic-compute-cloud-ec2, obtained on Dec. 5, 2011, 2 pages.

Ammons et al., "Libra: A Library OS for a JVM in a Virtualized Execution Environment", In Proceedings of the 3rd International Conference on Virtual Execution Environments, Jun. 13-15, 2007, 11 pages.
Anderson, "The Case for Application-specific Operating Systems", In Proceedings of the 3rd Workshop on Workstation Operating Systems, Apr. 23-24, 1992, 3 pages.
Appavoo et al., "Providing a Linux API on the Scalable K42 Kernel", In Proceedings of the 2003 USENIX Annual Technical Conference, Jun. 9-14, 2003, 14 pages.
Azab et al., "SICE: A Hardware-Level Strongly Isolated Computing Environment for x86 Multi-core Platforms", CCS'11, Oct. 17-21, 2011, Chicago, Illinois, 14 pages.
Barham et al., "Xen and the Art of Virtualization", In Proceedings of the 19th ACM Symposium on Operating Systems Principles, Oct. 19-22, 2003, 14 pages.
Baumann et al., "The Multikernel: A New OS Architecture for Scalable Multicore Systems", In Proceedings of the 22nd ACM Symposium on Operating Systems Principles, Oct. 11-14, 2009, 15 pages.
Bershad et al., "Extensibility, Safety and Performance in the SPIN Operating System", Proceedings of the fifteenth ACM symposium on Operating systems principles, Published Date: Dec. 3, 1995, 17 pages.
Bhattiprolu et al., "Virtual Servers and Checkpoint/Restart in Mainstream Linux", SIGOPS Operating Systems Review, Jul. 2008, 10 pages.
Bugnion et al., "Disco: Running Commodity Operating Systems on Scalable Multiprocessors", ACM Transactions on Computer Systems, vol. 15, No. 4, Nov. 1997, 36 pages.
Celesti et al., "Improving Virtual Machine Migration in Federated Cloud Environments", Second International Conference on Evolving Internet, Published date: Sep. 20-25, 2010, 7 pages.
Chahal et al., "Testing Live Migration with Intel Virtualization Technology FlexMigration", Intel Information Technology, Jan. 2009, 12 pages.
Chang et al., "User-level Resource-constrained Sandboxing", USENIX-NT, Aug. 2000, 11 pages.
Chen et al., "Setuid Demystified", In Proceedings of the 11th USENIX Security Symposium, Aug. 5-9, 2002, 20 pages.
Cheriton et al., "A Caching Model of Operating System Kernel Functionality", In Proceedings of the 1st USENIX Symposium on Operating Systems Design and Implementation, Nov. 1994, 15 pages.
Christodorescu et al., "Cloud Security Is Not (Just) Virtualization Security", CCSW'09, Nov. 13, 2009, Chicago, Illinois, 6 pages.
Eiraku et al., "Fast Networking with Socket Outsourcing in Hosted Virtual Machine Environments", In Proceedings of the 24th ACM Symposium on Applied Computing, Mar. 8-12, 2009, 8 pages.
Engler et al., "Exokernel: An Operating System Architecture for Application-level Resource Management", In Proceedings of the 15th ACM Symposium on Operating Systems Principles, Dec. 3-6, 1995, 16 pages.
Franke et al., "Fuss, Futexes and Furwocks: Fast Userlevel Locking in Linux", In Proceedings of the Ottawa Linux Symposium, Jul. 11-14, 2010, 19 pages.
Garfinkel et al., "Flexible OS Support and Applications for Trusted Computing", Proceedings of the 9th conference on Hot Topics in Operating Systems, May 2003, 6 pages.
Garfinkel et al., "Terra: A Virtual Machine-Based Platform for Trusted Computing", Proceedings of the nineteenth ACM symposium on Operating systems principles, Published Date: Oct. 22, 2003, 14 pages.
Garfinkel, "Traps and Pitfalls: Practical Problems in System Call Interposition Based Security Tools", In Proceedings of the Network and Distributed Systems Security Symposium, Feb. 6-7, 2003, 14 pages.
Gupta et al., "Difference Engine: Harnessing Memory Redundancy in Virtual Machines", In Proceedings of the 8th USENIX Symposium on Operating Systems Design and Implementation, Dec. 8-10, 2008, 14 pages.
Helander, "Unix Under Mach: The Lites Server", Helsinki University of Technology, Helsinki, Dec. 30, 1994, 71 pages.
Howell et al., "Living Dangerously: A Survey of Software Download Practices", Microsoft Research, May 2010, 16 pages.

(56) References Cited

OTHER PUBLICATIONS

Intel Cloud Builder Guide, "Intel Cloud Builders Guide to Cloud Design and Deployment on Intel Platforms", www.intel.com/en_US/Assets/PDF/general/icb_ra_cloud_computing_Parallels_TCP.pdf, Retrieved Date: Dec. 7, 2011, 19 pages.
Ko et al., "TrustCloud: A Framework for Accountability and Trust in Cloud Computing", Published Jul. 8, 2011, 5 pages.
Leslie et al, "The Design and Implementation of an Operating System to Support Distributed Multimedia Applications", IEEE Journal on Selected Areas in Communications, May 1996, 18 pages.
Litzkow et al., "Checkpoint and Migration of UNIX Processes in the Condor Distributed Processing System", University of Wisconsin Madison, Apr. 1997, 9 pages.
Loscocco et al., "Integrating Flexible Support for Security Policies into the Linux Operating System", In Proceedings of the 2001 USENIX Annual Technical Conference, Feb. 2001, 62 pages.
Love, "Get on the D-BUS", Linux Journal, accesible from http://www.ee.ryerson.ca/courses/coe518/LinuxJournal/elj2005-130-D-BUS.pdf, obtained on Jun. 18, 2006, 5 pages.
Malan et al., "DOS as a Mach 3.0 Application", In Proceedings of the USENIX Mach Symposium, Nov. 1991, 14 pages.
Marosi et al., "Using VirtualMachines in Desktop Grid Clients for Application Sandboxing", CoreGRID Technical Report, No. TR-140, Aug. 31, 2008, 13 pages.
Microsoft, "Microsoft Application Virtualization (App-V)", accessible from http://www.microsoft.com/en-us/windows/enterprise/products-and-technologies/virtualization/app-v.aspx, obtained on Dec. 7, 2011, 2 pages.
Microsoft, "Performance Tuning Guidelines for Windows Server 2008 R2", Redmond, WA, May 16, 2011, 118 pages.
Microsoft, "Remote Desktop Protocol: Basic Connectivity and Graphics Remoting Specification", Redmond, WA, release: Sep. 20, 2011, 417 pages.
Mihocka et al., "Virtualization without direct execution or jitting: designing a portable virtual machine infrastructure", retrieved at bochs.sourceforge.net/Virtualization_Without_Hardware_Final.PDF, Jun. 21, 2008, 16 pages.
Office action for U.S. Appl. No. 12/463,892, mailed on Jun. 14, 2012, Howell et al., "Executing Native-Code Applications in a Browser", 15 pages.
Porter et al., "Rethinking the Library OS from the Top Down", ASPLOS' 11, Mar. 5-11, 2011, Newport Beach, California, 15 pages.
Tucker et al., "Solaris Zones: Operating System Support for Server Consolidation", In Proceedings of the Large Installation Systems Administration Conference, Nov. 2004, 2 pages.
Roscoe et al., "Hype and Virtue", In Proceedings of the 11th USENIX Workshop on Hot Topics in Operating Systems, Aug. 2007, 6 pages.
Sapuntzakis et al., "Virtual Appliances for Deploying and Maintaining Software", In Proceedings of the Large Installation Systems Administration Conference, Oct. 2003, 15 pages.
Smith, Roderick W., "Using QEMU for cross-platform development", retrieved at www.ibm.com/developerworks/linux/library/I-qemu-development/?ca=drs-, Feb. 9, 2010, 7 pages.
Soltesz et al., "Container-based Operating System Virtualization: A Scalable, High-performance Alternative to Hypervisors", In Proceedings of the 2nd ACM SIGOPS/EuroSys European Conference on Computer Systems, Mar. 21-23, 2007, 13 pages.
Spear et al., "Solving the Starting Problem: Device Drivers as Self-describing Artifacts", In Proceedings of the EuroSys 2006 Conference, Apr. 18-21, 2006, 13 pages.
Sugerman et al., "Virtualizing I/O Devices on VMware Workstations Hosted Virtual Machine Monitor", In Proceedings of the 2001 USENIX Annual Technical Conference, Jun. 25-30, 2001, 15 pages.
Szefer et al., "A Case for Hardware Protection of Guest VMs from Compromised Hypervisors in Cloud Computing", Proceedings of the Second International Workshop on Security and Privacy in Cloud Computing (SPCC 2011), Jun. 2011, 5 pages.
Szefer et al., "Eliminating the Hypervisor Attack Surface for a More Secure Cloud", published Oct. 17-21, 2011, CCS'11, 12 pages.

Ta-Min et al., "Splitting Interfaces: Making Trust between Applications and Operating Systems Configurable", Proceedings of the 7th symposium on Operating systems design and implementation, Published Date: Nov. 2006, 14 pages.
VMWare ThinApp, "Application Virtualization Made Simple", accessible from http://www.vmware.com/products/thinapp/overview.html, data sheet obtained on Aug. 29, 2012, 2 pages.
Waldspurger, "Memory Resource Management in VMware ESX Server", In Proceedings of the 5th USENIX Symposium on Operating Systems Design and Implementation, Dec. 2002, 14 pages.
Whitaker et al., "Scale and Performance in the Denali Isolation Kernel", In Proceedings of the 5th USENIX Symposium on Operating Systems Design and Implementation, Dec. 9-11, 2002, 15 pages.
Wood, et al., "CloudNet: Dynamic Pooling of Cloud Resources by Live WAN Migration of Virtual Machines", VEE'11, Mar. 9-11, 2011, Newport Beach, California, 12 pages.
Zeldovich et al., "Making Information Flow Explicit in Histar", In Proceedings of the 8th USENIX Symposium on Operating Systems Design and Implementation, Nov. 2006, 16 pages.
Douceur et al., "Leveraging Legacy Code to Deploy Desktop Applications on the Web", In Proceedings of the 8th USENIX Symposium on Operating Systems Design and Implementation, Dec. 2008, 16 pages.
Douceur, et al., "Leveraging Legacy Code to Deploy Desktop Applications on the Web", retrieved on Mar. 3, 2009 at <<http://www.usenix.org/events/osdi08/tech/full_papers/douceur/douceur_html/index.html>22 , Microsoft Research, pp. 1-21.
Douceur, et al., "Leveraging Legacy Code to Deploy Desktop Applications on the Web", retrieved on Oct. 11, 2010 at <<http://research.microsoft.com/pubs/72878/xax-osdi08.pdf>>, USENIX Association, Proceedings of Conference on Operating Systems Design and Implementation, San Diego, California, 2008, pp. 339-354.
LeVasseur et al., "Pre-Virtualization: Slashing the Cost of Virtualization", University of Karlsruhe, Germany, IBM, T. J. Watson Research Center, New York National ICT, Australia University of New South Wales, Australia, Nov. 2005.
Office action for U.S. Appl. No. 13/372,390, mailed on Mar. 12, 2013, Baumann et al., "Cryptographic Certification of Secure Hosted Execution Environments", 17 pages.
Office action for U.S. Appl. No. 13/196,235, mailed on Apr. 8, 2013, Douceur et al., "Constraining Execution of Specified Device Drivers", 25 pages.
Office action for U.S. Appl. No. 13/323,562, mailed on May 8, 2013, Baumann et al., "Facilitating System Service Request Interactions for Hardware-Protected Applications", 13 pages.
Vaarala, S., "Security Considerations of Commodity x86 Virtualization", Helsinki University of Technology, Telecommunications Software and Multimedia Laboratory, May 22, 2006.
Yee, et al., "Native Client: A Sandbox for Portable, Untrusted x86 Native Code", retrieved on Oct. 11, 2010 at <<https://agora.cs.illinois.edu/download/attachments/28320883/nativeclient.pdf>>, IEEE Symposium on Security and Privacy, 2009, pp. 1-15.
Allen, "Windows Vista Application Development Requirements for User Account Control Compatibility", retrieved from <<http://msdn.microsoft.com/en-us/library/bb530410.aspx>>, Jun. 2007, 59 pages.
Charles, "Mark Russinovich: Inside Windows 7", retrieved at <<http://channel9.msdn.com/Shows/Going+Deep/Mark-Russinovich-Inside-Windows-7>>, Jan. 2009, 12 pages.
"Escaping from Microsoft's Protected Mode Internet Explorer—Evaluating a potential security boundary", retrieved at <<http://www.verizonbusiness.com/resources/whitepapers/wp_escapingmicrosoftprotectedmodeinternetexplorer_en_xg.pdf>>, White Paper, 2010, 8 pages.
Fischer, "Red Hat Enterprise Linux 4 Application Compatibility", retrieved from <<<http://www.redhat.com/f/pdf/rhel4/AppCompat.pdf>>, Feb. 2005, 12 pages.
International Search Report for International Appl. No. PCT/US2012/027635 dated Oct. 30, 2012, 3 pages.
"Internet Information Services 7.5", Retrieved at <<http://technet.microsoft.com/en-us/library//dd364124(wa.10).aspx>>, Mar. 24, 2009, 3 pages.
Kobayashi, et al., "Quick Reboot-based Recovery for Commodity Operating Systems in Virtualized Server Consolidation," Retrieved at

(56) References Cited

OTHER PUBLICATIONS

<<http://eurosys2010-dev.sigops-france.fr/workshops/IIDS2010/iids2010_7.pdf>>, Feb. 2010, Association for Computing Machinery, 6 pages.
Microsoft-TechNet.com, "Device Management and Installation Step-by-Step Guide: Signing and Staging Device Drivers in Windows 7 and Windows Server 2008 R2" retrieved on Aug. 19, 2012 at <<http://technet.microsoft.com/en-us/library/dd919230(v=WS.10).aspx>>.
NPL Search Results U.S. Appl. No. 13/196,235, Elsevier Eng. Info. Inc., 2013, 23 pages.
Office Action dated Jun. 10, 2013 for related matter U.S. Appl. No. 13/107,973 (332238.01), Bond et al., "Instruction Set Emulation for Guest Operating Systems".
Office action for U.S. Appl. No. 13/107,973, mailed on Jun. 10, 2013, Barry C. Bond, "Instruction Set Emulation for Guest Operating Systems", 14 pages.
Office action for U.S. Appl. No. 13/323,465, mailed on Sep. 13, 2013, Baumann, et al., "Cryptographic Certification of Secure Hosted Execution Environments", 15 pages.
Office action for U.S. Appl. No. 13/372,390, mailed on Sep. 19, 2013, Baumann, et al., "Cryptographic Certification of Secure Hosted Execution Environments", 20 pages.
Office action for U.S. Appl. No. 13/196,235, mailed on Oct. 15, 2013, Douceur, et al., "Constraining Execution of Specified Device Drivers ", 29 pages.
Office action for U.S. Appl. No. 13/323,562, mailed on Oct. 23, 2013, Baumann, et al., "Facilitating System Service Request Interactions for Hardware-Protected Applications", 16 pages.
Office action for U.S. Appl. No. 13/107,973, mailed Oct. 25, 2013, Barry C. Bond, "Instruction Set Emulation for Guest Operating Systems", 12 pages.
Office Action for U.S. Appl. No. 12/834,895, mailed on Nov. 6, 2012, Hunt, et al., "Ultra-Low Cost Sandboxing for Application Appliances", 19 pages.
Office Action for U.S. Appl. No. 13/345,031, mailed on Nov. 6, 2013, Hunt, et al., "Dynamic Application Migration", 8 pages.
Office Action dated Dec. 12, 2012 for related matter U.S. Appl. No. 13/107,973 (332238.01), Bond et al., "Instruction Set Emulation for Guest Operating Systems".
Office action for U.S. Appl. No. 13/107,973, mailed on Dec. 21, 2012, Barry C. Bond, "Instruction Set Emulation for Guest Operating Systems", 12 pages.
Office Action for U.S. Appl. No. 12/834,895, mailed on Apr. 30, 2013, Hunt, et al., "Ultra-Low Cost Sandboxing for Application Appliances", 23 pages.
Office Action for U.S. Appl. No. 13/314,512, mailed on Jul. 30, 2013, Hunt, et al., "Application Compatibility with Library Operating Systems", 19 pages.
Vaughan-Nichols, "New Approach to Virtualization Is a Lightweight," retrieved at <<http://ieeexplore.ieee.org/stamp/stamp.jsp?tp=&arnumber=4014757>>, IEEE, Computer, vol. 39, Issue 11, Nov. 2006, pp. 12-14.
Bagchi, "On Reliable Distributed IPC/RPC Design for Interactive Mobile Applications", ACM, Bangkok Thailand, 2010, 6 pages.
Zhou et al., "Flexible On-Device Service Object Replication with Replets", In the Proceedings of the 13th International Conference on World Wide Web, May 17, 2004, pp. 131-142.
Office Action for U.S. Appl. No. 13/107,973 dated Dec. 21, 2012, Bond, et al., 12 pages.
Office action for U.S. Appl. No. 13/323,465, mailed on Mar. 12, 2014, Baumann et al., "Cryptographic Certification of Secure Hosted Execution Environments", 20 pages.
Office action for U.S. Appl. No. 13/196,235, mailed on Apr. 9, 2014, Douceur et al., "Constraining Execution of Specified Device Drivers", 34 pages.
Non-Final Office Action for U.S. Appl. No. 13/196,235, mailed on Jul. 3, 2014, Douceur et al., "Constraining Execution of Specified Device Drivers", 31 pages.
Tan, et al. "iKernel: Isolating Buggy and Malicious Device Drivers Using Hardware Virtualization Support", SlideShare, Inc., Proceedings of the Third IEEE International Symposium on Dependable, Autonomic and Secure Computing (DASC 07) 2007, 7 pages.

\* cited by examiner

APPLICATION COMPATIBILITY SHIMS FOR MINIMAL CLIENT COMPUTERS

BACKGROUND

Many applications that run on client computing devices rely on rich functionality that these clients traditionally provide. For instance, current web applications run atop a large set of functionality provided by a browser, an operating system, and various libraries—each of which today's client computing devices store and make available to these applications. However, current computing trends suggest a future in which applications include all the code necessary to support their operation, and the client computing system provides only a minimal execution environment. By including all of the necessary code in this manner, these applications effectively place the entire task of ensuring the applications' efficacy on the applications' developer—a task that is currently divided between the developer's and the users of the applications.

While such an environment may be beneficial by pushing administration tasks to developers in this manner, this environment may render inoperable legacy applications (e.g., web applications) that rely on the rich functionality traditionally provided by client devices.

SUMMARY

This document describes, in part, techniques for allowing a computing device that provides a minimal execution environment to execute legacy applications that rely on rich functionality that the computing device does not natively provide.

For instance, a computing device may initially receive a request to execute an application and, in response, may determine whether the application is directly executable on the client device or whether the application utilizes functionality (e.g., system services) that the computing device does not natively provide. The computing device may execute the application in response to determining that the application is directly executable. In response to determining that the application is not directly executable, however, the computing device may determine whether the application specifies another application (e.g., a web browser or another client application) to provide the functionality, such as the system services.

If the application specifies another application to provide this functionality, then the computing device retrieves (remotely or locally) the specified application and executes the specified application on the client computing device. If the application does not specify such an application, then the computing device may execute a default application (e.g., a default browser) for providing the functionality. The specified or default application then executes the application that is not directly executable on the minimal-execution-environment computing device.

This summary is provided to introduce concepts relating to compatibility shims. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
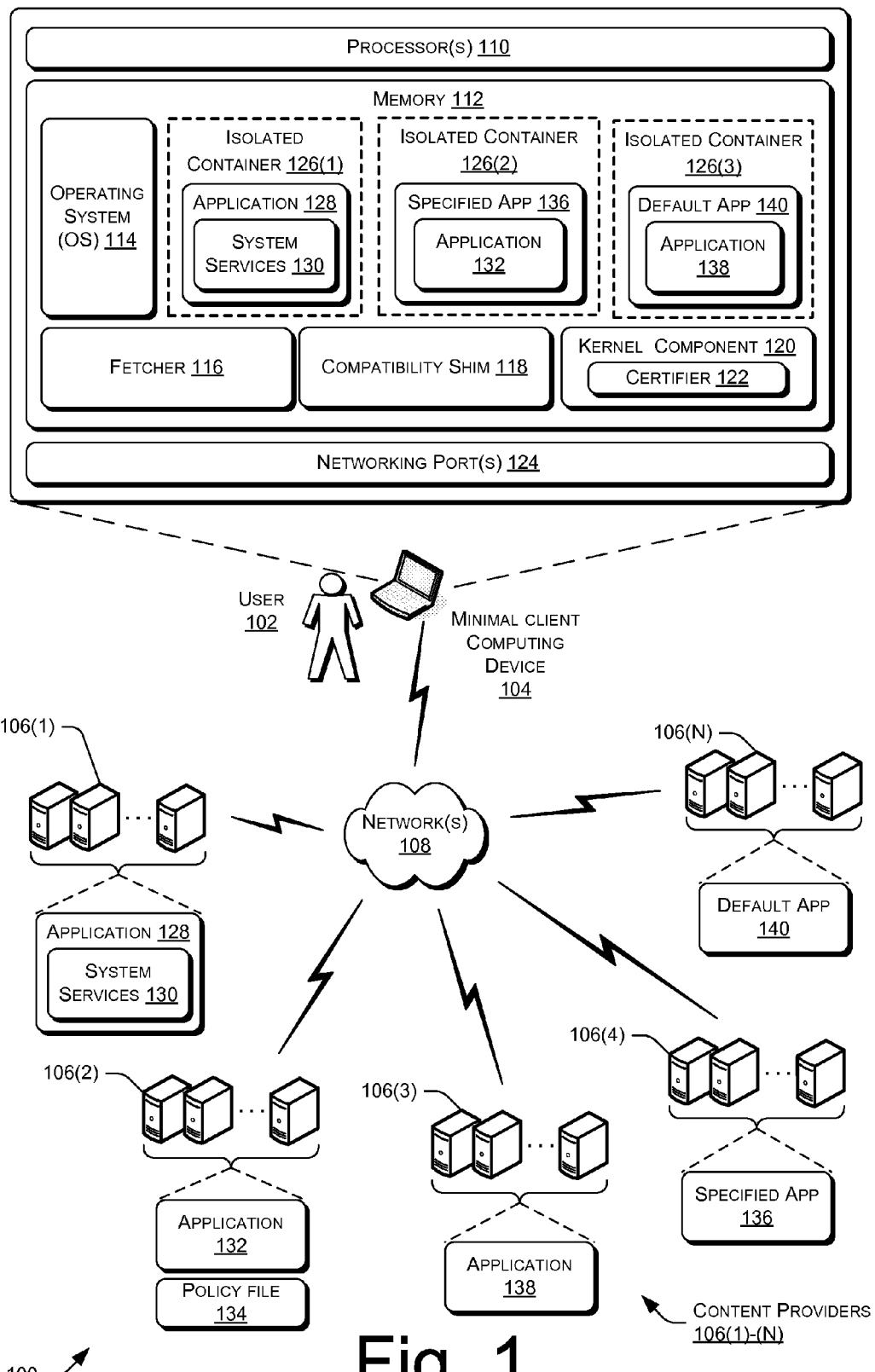
FIG. 1 illustrates an example computing architecture that includes a client device storing a compatibility shim. This shim enables the client device to execute applications that utilize functionally that the client device does not natively provide.

This document describes, in part, techniques for allowing a computing device that provides a minimal execution environment to execute legacy applications that rely on rich functionality that the computing device does not natively provide.

For instance, a computing device may initially receive a request to execute an application and, in response, may determine whether the application is directly executable on the client device or whether the application utilizes functionality (e.g., system services) that the computing device does not natively provide. The computing device may execute the application in response to determining that the application is directly executable. In response to determining that the application is not directly executable, however, the computing device may determine whether the application specifies another application (e.g., a web browser or another client application) to provide the functionality, such as the system services.

If the application specifies another application to provide this functionality, then the computing device retrieves (remotely or locally) the specified application and executes the specified application on the client computing device. If the application does not specify such an application, then the computing device may execute a default application (e.g., a default browser) for providing the functionality. The specified or default application then executes the application that is not directly executable on the minimal-execution-environment computing device.

The detailed discussion below begins with a section entitled "Client Computing Devices that Provide a Minimal Execution Environment," which provides context for the discussion that follows regarding the compatibility techniques. A section entitled "Example Computing Architecture" follows and describes one non-limiting environment that may implement the described compatibility techniques. A section entitled "Example Compatibility Processes" follows, before a brief conclusion ends the discussion.

This brief introduction, including section titles and corresponding summaries, is provided for the reader's convenience and is not intended to limit the scope of the claims, nor the proceeding sections.

Client Computing Devices that Provide a Minimal Execution Environment

The majority of users of client computing devices do not wish to serve as a system administrator of their respective devices, and yet existing client architectures often require administration. For instance, because each application installed on a client may potentially affect any other installed application, an astute user exercises great care in choosing which applications to install. In contrast to this traditional client-device model, a different model that is pertinent to the following discussion asserts that a client device may function like a miniature data center that hosts client applications.

The client device strongly isolates each application from another, provides a minimal trusted computing base or execution environment, derives system services from opt-in library components or library components provided by the applications themselves, and enables communication between other applications via function-specific network protocols. This model allows application providers to assume complete responsibility for the correct and secure operation of their apps—rather than thrusting a portion of this responsibility onto the user, as the current model does.

In this new model, a client device may provide a lightweight virtual machine for each client application, as a data center provides an isolated virtual machine for each hosted server application. This structure alleviates concern about the security vulnerabilities that are inherent in a rich client platform, because the rich functionality used by each application executes within an isolated container in which that application executes.

This model may also extend to the communication between applications. For entities whose business logic is run by server applications in data centers, a business relationship between two entities may involve communication between their respective server applications. This communication occurs via network protocols, even if the virtual machines that contain the two server applications happen to be running in the same data center or even on the same physical machine. That is, running two server applications in the same data center gives them no special access rights with regard to each other. Likewise, running two client applications in the same client device does not give these applications special access rights in the proposed model.

Because server applications in data centers are strongly isolated and given no special access rights, a hosting center can accept a new customer without making a decision about whether to trust the customer's application. Similarly, a client architecture as proposed herein allows a user to run a client application without making a decision about trusting the application—in stark contrast to the desktop-application model, where installing an application is a significant trust decision.

To realize this model, a client computer may include or exhibit one or more of the following characteristics.

First, for security against malicious applications, the client device may enforce strong application isolation using a minimal monitor. The use of "minimal" in this regard may refer to the amount of code in the trusted computing base in some instances, rather than the amount of code that runs in kernel mode. This is because the proposed model addresses the problem of system administration for end users, rather than the problem of code architecture for operating-system developers.

Second, in the proposed model, all or substantially all system services may be provided by library components that run inside each application's isolated container. In this manner, each application makes independent choices about what components to include, so the application is only vulnerable to code explicitly accepted by the developers of the application. This contrasts with OS-intrinsic system services, wherein a security vulnerability in a service can be exploited by any application to affect the behavior of any other application.

Third, in some instances the only path for cross-application communication is via network ports, even for applications running on the same client device. This follows directly from the principle that running two applications on the same machine gives them no special rights to access each other. This also encourages developers to treat all cross-application communication with the care that is often reserved for communication with an unknown remote host, such as careful sanitizing and integrity-checking.

Fourth, for each library component that provides cross-application functionality (via network communication), the component may provide the minimal and most specific functions for its intended semantics. This contrasts with the common approach of providing general mechanisms to support a wide range of uses, such as a file system that stores programs, libraries, application data, configuration information, and user documents. These traditional general mechanisms also serve as an out-of-core cache, an application-to-application data transfer stage, a publication site, and the like. With so many functions, such mechanisms become tantamount for applications, making each such mechanism effectively part of the trusted computing base. To avoid this, the proposed model asserts that the file system's distinct uses should be disaggregated into distinct components, each of which is limited to the functionality appropriate for one mode of cross-application communication.

In sum, the techniques below may be utilized, in some instances, on client computing devices providing a minimal execution environment. Such a client device functions as a tiny data center that may be as administration-free to an end user as an automated hosting center. This client-device model provides strong isolation on a minimal trusted computing base, and disaggregates cross-application functionality into minimal opt-in library components that communicate via network protocols. This approach enables users to run applications without needing to trust them, and enables application providers to ensure the correct and secure operation of their applications.

Example Computing Architecture

FIG. 1 illustrates an example computing architecture 100 that may implement the described techniques for allowing a computing device that provides a minimal execution environment to execute legacy applications that rely on rich functionality that the computing device does not natively provide.

The architecture 100 illustrates a user 102 operating a minimal client computing device 104 (or simply "client device 104" or "computing device 104") that may include some or all of the features described in the preceding section. While illustrated as a laptop, the computing device 104 may instead comprise a personal computer, a mobile telephone, a server computer, a portable music player, or any other sort of suitable computing device.

In the illustrated architecture 100, the user 102 may, in some instances, operate the client device 104 to execute applications hosted by one or more content providers 106(1), ..., 106(N) accessible over a network 108. The network 108 is representative of any one or combination of multiple different types of networks, such as the Internet, cable networks, cellular networks, wireless networks, and wired networks. Some or all of the applications hosted by the providers 106(1)-(N) and accessible over the network 108 may herein be referred to as "web applications."

As illustrated, the minimal computing device 104 includes one or more processors 110 and memory 112. The memory 112 may comprise computer-readable media. This computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

In the illustrated example, the memory 112 stores an operating system 114, a fetcher 116, a compatibility shim 118, and a component 120 stored in a kernel of the computing device 104 for executing applications as described below. The kernel component 120 also includes a certifier 122 for verifying principals responsible for the executed applications, also as described below. The operation of these components is described in detail with reference to FIGS. 2-5. In addition, the computing device 104 includes one or more networking ports 124 for applications hosted by the content providers 106(1)-(N) to run on. When executed, the computing device 104 executes these applications within respective isolated containers in the manner described in the preceding section.

FIG. 1 illustrates an example array of content providers and applications hosted thereon, each of which may be executable on the computing device 104, natively or in a compatibility mode. For instance, the architecture 100 includes a content provider 106(1) that stores an application 128. This application includes all or substantially all of the system services 130 that the application 128 utilizes to execute. That is, the application 128 includes the system services 130 that a traditional client device provides (many of which are often provided in a native browser and/or OS for the purpose of rendering the application 128. However, in the architecture 100, the minimal client device 104 does not natively provide these system services 130. These system services include rendering stacks, libraries, plug-ins, a JavaScript engine, a multimedia platform for adding animation, video, or interactivity to the particular web application (e.g., a Flash® player), a PDF® renderer, and the like.

In this example, the user 102 or another application operating the computing device 104 requests to execute the application 128 stored on the content provider 106(1). In response, the computing device 104 creates an isolated container 126(1) and then executes the application 128 within this isolated container 126(1). Because the application 128 provides each of the system services 130 used to execute the application 128, the computing device 104 is natively able to execute the application 128.

In addition, envision that the user 102 navigates to the content provider 106(2) for the purpose of requesting to execute the application 132. In the instance, the application 132 comprises a legacy application that has been written to rely on the system services provided by traditional client devices. However, because the minimal client device 104 does not natively provide these system services, the application 132 may utilize another application to provide these services.

In that regard, the application 132 also includes or is otherwise associated with a policy file 134 that specifies a particular application 136 to provide these system services. For instance, if the application 132 is a web application, the specified application 136 may comprise a particular web browser. As such, the developers of the application 132 may specify which web browser the computing device 104 should use to execute the application 132. As illustrated, another content provider (content provider 106(4)) may store the specified application 136, such as the web browser. By specifying a web browser in this manner, the developers of the application 132 need only test the application 132 against that single browser, knowing that the choice of browser has been taken out of the user's hands and into their own. In addition, this shift in responsibility may result in a more predictable and better performance of the application 132.

In this example, when the user 102 (or another application) requests to execute the application 132, the computing device 104 may attempt to locate the policy file 134. In some instances, the policy file may be stored at a pre-specified address that is standardized for each of the content providers 106(1)-(N). For instance, each content provider that includes such a policy file may store a text file having a canonical name, such as "compatibility_policy.txt" (or another name that is standardized). By employing a standardized name that each content provider may utilize, each client computing device (such as the device 104) can easily determine whether or not a particular application includes such a policy file. This, in turn, gives developers and content providers confidence that installation of such a file will in fact have the desired effect—namely the effect of refraining from running in compatibility mode (if the policy so specifies) or instructing the client devices to run the provider's application within a specified application (e.g., a specified browser).

As such, in the illustrated example the computing device 104 may attempt to locate a policy file when the user 102 requests to execute the application 132. In this example, the computing device 104 will locate the policy file 134 instructing the computing device 104 to first execute the specified application 136 prior to executing the application 132.

As illustrated, the computing device therefore creates an isolated container 126(2), retrieves the specified application 136 from the content provider 106(4) (assuming that the application 136 is not available locally), and then executes the specified application within the isolated container 126(2). At this point, the specified application 136 provides the system services for executing the application 132 and, further, begins executing the application 132 within the isolated container 126(2).

Although the policy file 136 specifies a particular application in which to execute the requested application 132 in this example, in other instances the policy file 136 may altogether forbid execution of the application 132 in compatibility mode. For instance, if the content provider 106(2) provides a version of the application 132 that is fully executable on the client device 104 (a la the application 128), then the content provider 106(2) may configure the policy file to forbid execution of the application in compatibility mode—using the default application or otherwise. This places control in hands of the provider, who may decide that the security vulnerabilities associated with the default application or other similar applications (e.g., browsers) pose too great of a risk. The instruction in the policy file 134 would, therefore, essentially ensure that the client device 104 will refrain from executing the application 132 in the compatibility mode.

In yet another instance, the user 102 may request to execute a legacy application 138 that neither includes the system services for directly executing on the minimal client computing device 104, nor specifies an application for providing these system services. In this example, when the user 102 (or another application) makes the request to execute this application 138, the computing device 104 will initially determine that this application is not directly executable on the device. In response, the device 104 will attempt to locate the policy file at the pre-specified address described above. Here, because neither the application 138 nor the content provider 106(3) includes or specifies such a file, the device 104 will be unable to locate such a file.

Therefore, the computing device 104 may utilize a default application 140 for providing the system services. For instance, in the case where the application 138 comprises a web application and the content provider 106(3) does not specify a particular browser to execute the application 138, the computing device 104 may execute a default browser. In the instant example, the computing device 104 may create an isolated container 126(3), retrieve the default application 140 from the content provider 106(N), and execute the default application within the isolated container 126(3). The requested application 138 may then execute within the isolated container 126(3) atop the default application, as illustrated.

The minimal client computing device 104, therefore, is able to execute legacy applications that rely on rich functionality that the computing device does not natively provide. Furthermore, the device 104 is able to allow developers and content providers to specify which applications to use when executing these applications, at the cost of creating a single text file. Further, if the developers and content providers do not take this single step, the device 104 still executes the application with reference to a default application. The computing device 104, therefore, provides a substrate to execute applications that provide their own system services, while still able to execute applications that have yet to transition to this paradigm.

Example Compatibility Processes

FIGS. 2-5 comprise example flow diagrams of example processes that may be implemented within the architecture 100 of FIG. 1, or within other architectures. Each of these processes is illustrated as a collection of acts in a logical flow graph, which represents a sequence of operations that can be implemented in hardware, software, or a combination thereof. In the context of software, the blocks represent computer instructions stored on one or more computer-readable media that, when executed by one or more processors, perform the recited operations. Note that the order in which the process is described is not intended to be construed as a limitation, and any number of the described acts can be combined in any order to implement the process, or an alternate process. Additionally, individual blocks may be implemented in parallel with one another or deleted altogether from the process without departing from the spirit and scope of the subject matter described herein.

Figure 2A:
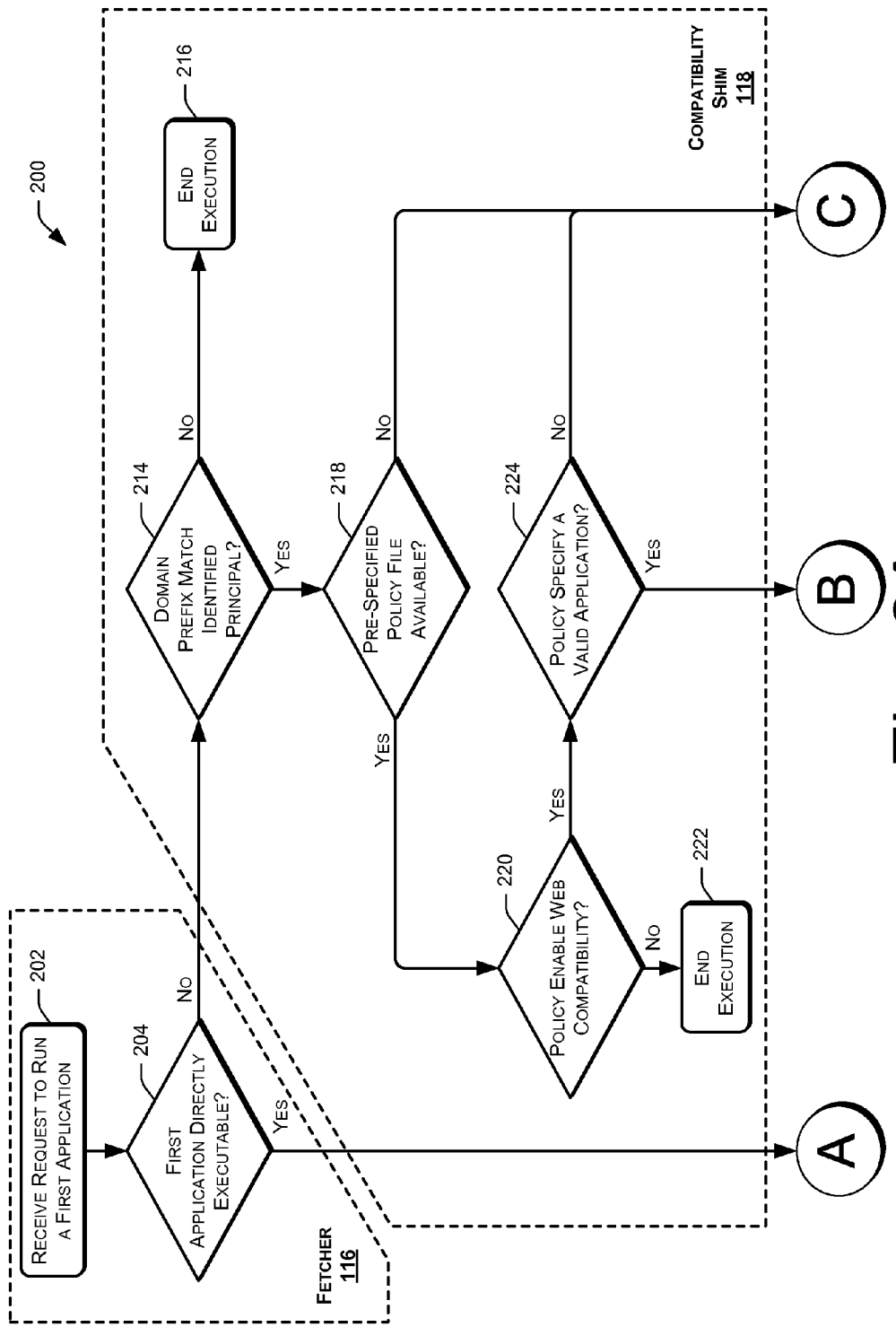
FIGS. 2A-2B illustrate a flow diagram of an example process for executing applications that are directly executable on the client device of FIG. 1, as well applications that are not.
Figure 2B:
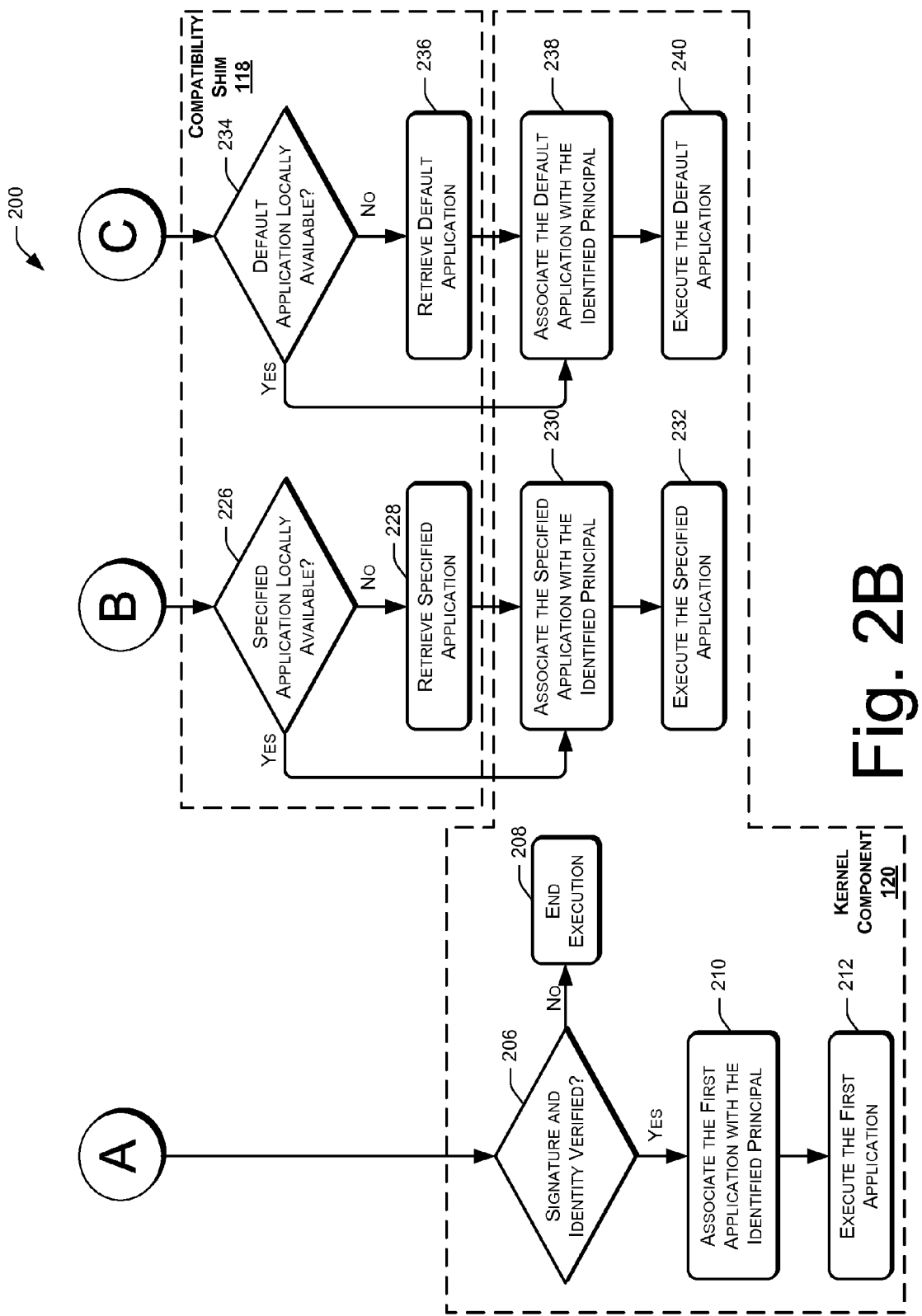

FIGS. 2A-2B illustrate an example flow diagram of a process 200 for executing applications that are directly executable on the client device 104 of FIG. 1, as well applications that are not. In this example, the process 200 illustrates which components of may perform which operations of the process. However, the operations may be performed by other components in different embodiments.

At 202, the fetcher 116 receives a request to execute a first application, such as a web application. The request may be initiated by a user or another application. The request may specify a principal that is associated with the first application. For instance, if the first application is directly executable on the minimal substrate provided by the computing device 104, then the request may include a hash of the executable file as well as a signature on that hash that has been created using a private key known to be associated with the principal. For instance, if the first application comprises Excel® by Microsoft® Corporation, then the request may include a hash of the executable and a signature on the hash that has been created using a private key associated with Microsoft®. If, however, the first application is not directly executable on the client device 104, then the URL associated with the application may identify the principal, as discussed below.

At 204, the fetcher 116 determines whether the first application is directly executable on the client device 104. For instance, the fetcher 116 may determine that the first application is executable on the client device when it provides (1) a hash of an executable type that provides the system services needed to execute on the minimal substrate provided by the client device 104, and (2) a signature that indicates a principal associated with the first application. When the fetcher 116 determines that the first application is directly executable, the process 200 proceeds to FIG. 2B.

Turning to FIG. 2B, at 206, the certifier 122 within the kernel component 120 attempts to verify the signature and the principal provided by the first application. For instance, in the Excel® example, the certifier 122 may retrieve a public key associated with Microsoft® to verify that the signature was in fact created with a private key associated with Microsoft®. In addition, the certifier 122 may identify the specified principal (in this instance, Microsoft®) by following a chain of certificates (e.g., provided by the first application at 202).

If the signature or the identified principal is not verified (potentially meaning that the application requesting to start the application or the fetcher 116 effectively lied about the identity of the principal), then the kernel component 120 may end the execution of the process at 208. That is, the kernel component 120 may refrain from running the first application as requested. If, however, the kernel component 120 verifies the signature and the principal, then the kernel component 120 may associate the application with the identified principal (e.g., Microsoft®) at 210. At 212, the kernel component 120 executes the first application, potentially within a secure container described above. When the first application executes, the kernel component 120 may visibly indicate the name of the principal that was associated with the first application at 210. For example, the kernel component 120 may include the name of the principal (e.g., "Microsoft®") in a menu bar or "chrome" of the application.

Returning to FIG. 2A, when the first application is not directly executable on the minimal substrate provided by the computing device, the caller requesting to start the application may simply include a URL to the first application and an identity of a principal associated with the application pointed to by the URL. The fetcher 116 may then make the determination that this URL specifies content that is not directly executable on the computing device 104—that is, that the URL specifies an application that utilizes system services that neither computing device 104 nor the first application natively provides. In this instance, the process 200 may proceed down the "No" branch of 204 to 214.

At 214, the compatibility shim 118 (forming a portion of the trusted computing base of the device 104) may determine whether a domain prefix matches the principal identified in the request to execute the first application. For instance, envision that the user selected a URL "http://www.example.com/news") that resulted in the request to execute the first application. Envision also that the caller sending the request provided an indication of the principal that should be associated with the first application. Because the caller did not provide a signature (as in the "Yes" branch of 204), the shim 118 may shorten the URL to "http://www.example.com." If the caller asked the computing device 104 to execute the first application in association with the principal of "example" or "http://www.example.com," then the shim 118 may determine that the domain prefix matches and may proceed down the "Yes" branch of 214. If, however, the caller had specified a principal that does not match the domain, then the shim 118 may end the execution at 216. This ensures that a caller is unable to make a malicious request. For instance, if the caller handed the fetcher a URL of "http://www.evil.com" and asked the fetcher to run the application under the guise of a trusted principal (e.g., "Microsoft®" or "http://www.microsoft.com"), then the shim 118 may abort the execution of the application.

Because the shim 118 effectively signs the principal identifier in this scenario (as opposed to having a signature based on a cryptographic key of a principal), then the principal identifier may be limited by the security of the protocols used by the shim to fetch the application, such as DNS, TCP, and HTTP. In other instances, meanwhile, the shim 118 may also identify web-compatible applications by a more-secure protocol, such as a HTTPS. In this case, the shim 118 fetches the application using protocols that provide a form of vendor authentication that is more secure (e.g., less spoofable) than the DNS/TCP/HTTP combination described above. In this case, the identification of the principal depends on the security of HTTPS and the certification authority (CA) mechanism associated with HTTPS.

In each case, the "strength" of a principal can be readily ascertained, as shim-booted applications are associated with principals whose names indicate the protocol suite that started them. This ensures that a weak DNS principal is unable to masquerade as a stronger HTTPS principal, and that an HTTPS principal is unable to masquerade as a very-strong native principal based on a cryptographic key signature.

In each of the cases described immediately above, the shim 118 determines, at 218, whether a pre-specified policy file is available for the first application after determining that the domain name matched the principal at 214. For instance, the shim 118 may attempt to locate the text file located at the pre-specified address as discussed above. This text file (or other type of policy file) allows a content provider to specify which application the computing device 104 should execute to provide the system services utilized for executing the first application, as well as whether the application is web-compatible at all, as discussed in detail below.

When the shim 118 is able to locate the policy file, the shim 118 analyzes the policy file to determine, at 220, whether the policy includes an indication that the first application should not be executed in "compatibility mode." That is, a content provider associated with the first application may host an application that is fully executable on the minimal substrate provided by the computing device 104 and, hence, may indicate in the policy file that the first application should not execute on another application (e.g., a browser) that provides the system services. By enabling a content provider to provide such an indication, the techniques disallow a potentially malicious entity from executing an application using an application (e.g., a web browser) that the content provider has not explicitly approved. If the policy file indicates that the first application should not run in compatibility mode, then the shim 118 may end the execution of the application at 222.

In some instances, the shim 118 analyzes the policy file to determine whether the file includes an indication that explicitly opts out of compatibility mode, and proceeds in compatibility mode if the policy file does not include such an indication. In other instances, meanwhile, the shim 118 analyzes the policy file to determine whether the file includes an indication that explicitly opts into compatibility mode, and does not proceed in compatibility mode absent this explicit indication.

If the shim 118 analyzes the policy file and determines that the content provider has (explicitly or tacitly) enabled compatibility mode, then the shim analyzes the policy file in an attempt to locate a specified application for providing the system services for executing the first application. At 224, the shim determines whether the policy file validly specifies such application. If not, then process 200 proceeds down the same branch as the "No" branch of 218. If so, however, then the process 200 proceeds down the "Yes" branch.

Turning to FIG. 2B, in instances where the policy file specifies an application, the shim 118 determines, at 226, whether the specified application is available locally on the computing device 104. If not, then the shim retrieves the specified application 228. For instance, in the example of FIG. 1, the shim 118 may retrieve the specified application 136 from the content provider 106(4). After retrieving the specified application (or if it is already available locally), the kernel component 120 may associate the principal with the specified application at 230 and, at 232, may execute the specified application. For instance, if the specified application comprises a particular web browser, then the component in the kernel may execute the particular web browser in a manner that visibly indicates the principal. For instance, the kernel component 120 may indicate the principal (e.g., "Example" or "http://www.example.com") in the chrome of the browser. Now that the kernel component 120 has executed the specified application (possibly within an isolated container), the specified application may pull in the content from the first application while providing the system services utilized by the first application. The system services may include rendering stacks, libraries, and the like, as discussed above.

If, however, the shim 118 is unable to locate policy file at 218 (or if the policy file does not specify a valid application), then the process 200 proceeds down the "No" branch of 218 to FIG. 2B. At 234, the shim 118 determines whether the default application is available locally. If not, then the shim 118 retrieves the default application at 236. For instance, in the example of FIG. 1, the shim 118 may retrieve the default application 140 from the content provider 106(N).

After retrieving the default application (or if it is already available locally), the kernel component 120 may associate the principal with the default application at 238 and, at 240, may execute the default application. For instance, if the default application comprises a particular web browser, then the component in the kernel may execute the particular web browser in a manner that visibly indicates the principal, as discussed immediately above. Now that the kernel component 120 has executed the default application (possibly within an isolated container), the default application may pull in the content from the first application while providing the system services utilized by the first application.

Figure 3:
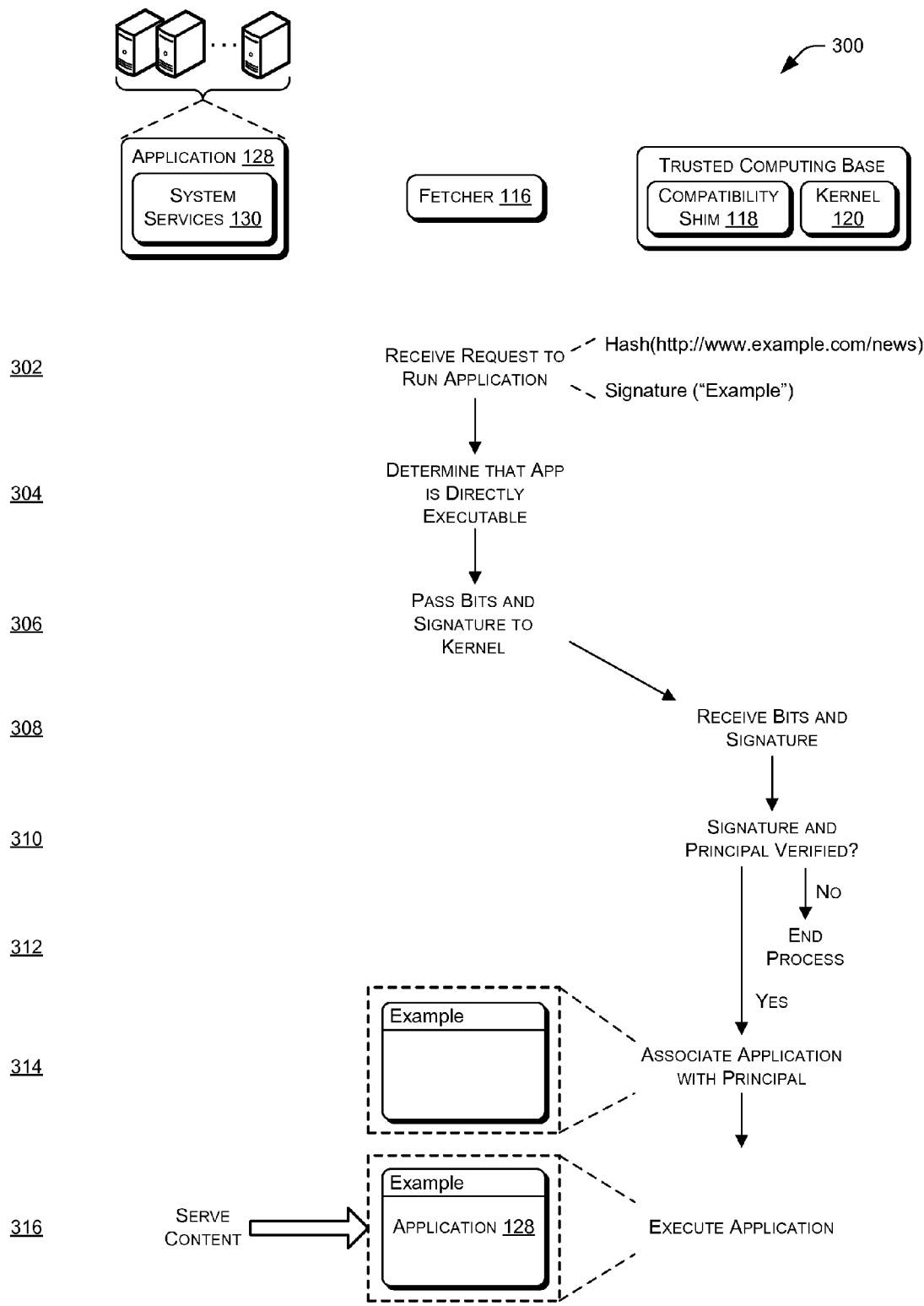
FIG. 3 is a flow diagram illustrating an example process for executing an application that is directly executable on the minimal execution environment that the client device of FIG. 1 provides.

With the architecture 100 and the process 200 in mind, FIGS. 3-5 proceed to illustrate, respectively, the following scenarios: (1) executing an application that is directly executable on the minimal client computing device 104; (2) executing an application that is not directly executable but that specifies an application to provide requisite system services, and (3) executing an application that is neither directly executable nor specifies an application to provide requisite system services. In these examples, operations located underneath a particular entity are performed by that particular entity. However, it is to be appreciated that these figures describe but several example implementations, and that the functionality may be executed by different combinations of components in other implementations.

FIG. 3, for instance, is a flow diagram illustrating an example process 300 for executing an application that is directly executable on the minimal execution environment that the client device 104 provides. At 302, the fetcher 116 receives a request to execute a particular application that is directly executable on the device 104. For instance, the application may comprise the application 128 described above, which includes each system service 130 utilized to execute the application 128. As such, the fetcher 116 may receive a hash of an executable file and a signature on that hash made with a private key of the principal associated with the file.

At 304, the fetcher 116 determines that the application 128 is directly executable on the client device. In response, at 306, the fetcher 116 passes the received bits and the signature to the kernel component 120 (here, represented in short as "kernel 120"). The kernel component 120 receives the bits and the signature at 308. As illustrated, both the shim 118 and the kernel component 120 form a portion of the trusted computing base of the computing device 104.

At 310, the certifier 122 within the kernel attempts to verify the signature and the principal associated with the application 128. If the certifier 122 is unable to verify the signature or the principal, then execution of the application ends at 312. If, however, the certifier 122 is able to verify the signature and the principal, then the kernel component 120 associates the application with the principal (e.g., "Example" in the illustrated example) at 314. At 316, the kernel component 120 then executes the application and the content provider 106 hosting the application may, in some instances, serve the content to the computing device 104. In other instances, however, the device 104 running the application 128 may additionally or alternatively request content from any other host or application on 104 via the network ports 124 as needed, given that the application is executing within its own isolated container.

FIGS. 4A-4D, meanwhile, collectively illustrate a flow diagram of an example process 400 for executing an application that is not directly executable on the minimal execution environment that the client device 104 provides. Here, the application specifies another application for providing the functionality that the minimal client device does not provide.

At 402, the fetcher 116 again receives a request to execute an application, such as the application 132 described above with reference to FIG. 1. For instance, the fetcher may receive a particular URL and an indication of the principal that is to be associated with the application. At 404, the fetcher 116 determines that this application utilizes certain system services that the computing device 104 does not natively provide and, hence, that the application is not directly executable on the device 104. That is, the fetcher 116 determines that the computing device 104 does not provide system services that, when combined with system services that the application provides, define a set of system services that are sufficient for rendering the application.

At 406, the fetcher 116 passes an address pointing to the application (e.g., a HTTP or HTTPS URL) and the identification of the principal to the trusted computing base and, namely, to the compatibility shim 118. At 408, the shim 118 receives the address and the identification. At 410, the shim 118 requests, from the address, bits to begin the process of running the application 132. At 412, the content provider hosting the application receives the request and provides the bits. At 414, the shim 118 receives the bits and identifies the principal according to its understanding of the protocol used.

At 416, the shim 118 determines whether the domain prefix matches the identified principal. If not, then the shim 118 aborts the process at 418. If so, however, then the process 400 proceeds to FIG. 4B. Here, the shim attempts to fetch a policy file associated with the application at 420. For instance, the shim 118 may look for a policy file having a pre-specified canonical name (e.g., "www.example.com/compatibility_policy.txt"). The shim 118 determines whether such a policy file is available at 422. If the policy file is not available, then the shim 118 uses a default application at 424, as described below with reference to the example of FIG. 5. In the illustrated example, meanwhile, the shim successfully locates the policy file 134 by, for instance, looking for a "compatibility_policy.txt" file at "www.example.com." As such, the shim 118 begins retrieving the policy file 134 at 426. At 428, the application 132 begins downloading the policy file 134 at the request of the shim 118. At 430, the shim 118 receives the downloaded policy file 134. At 432, the shim 118 analyzes the policy file FIG. 4C continues the illustration and includes the shim 118 determining, based on the analyzing, whether the application is able to run in compatibility mode at 434. If not, then the shim 118 aborts the process at 436. In this example, however, the shim 118 determines that the application is able to run in compatibility mode and, hence, analyzes the policy file in an attempt to locate an indication of a specified application. At 438, the shim 118 identifies an application that the policy file has specified for providing the requisite system services (e.g., for providing at least a portion of the set of system services that are sufficient for rendering the application). For instance, the policy file 134 may specify a particular browser to execute "underneath" the application 132. In the example of FIG. 1, this application may comprise the specified application 136.

At 440, the shim 118 determines whether this specified application is locally available on the computing device. If not, then the shim 118 requests the specified application 136 at 442. At 444, the content provider 106(4) hosting the specified application receives the request and provides the specified application to the computing device 104. At 446, the computing device 104 receives the specified application.

Figure 4A:
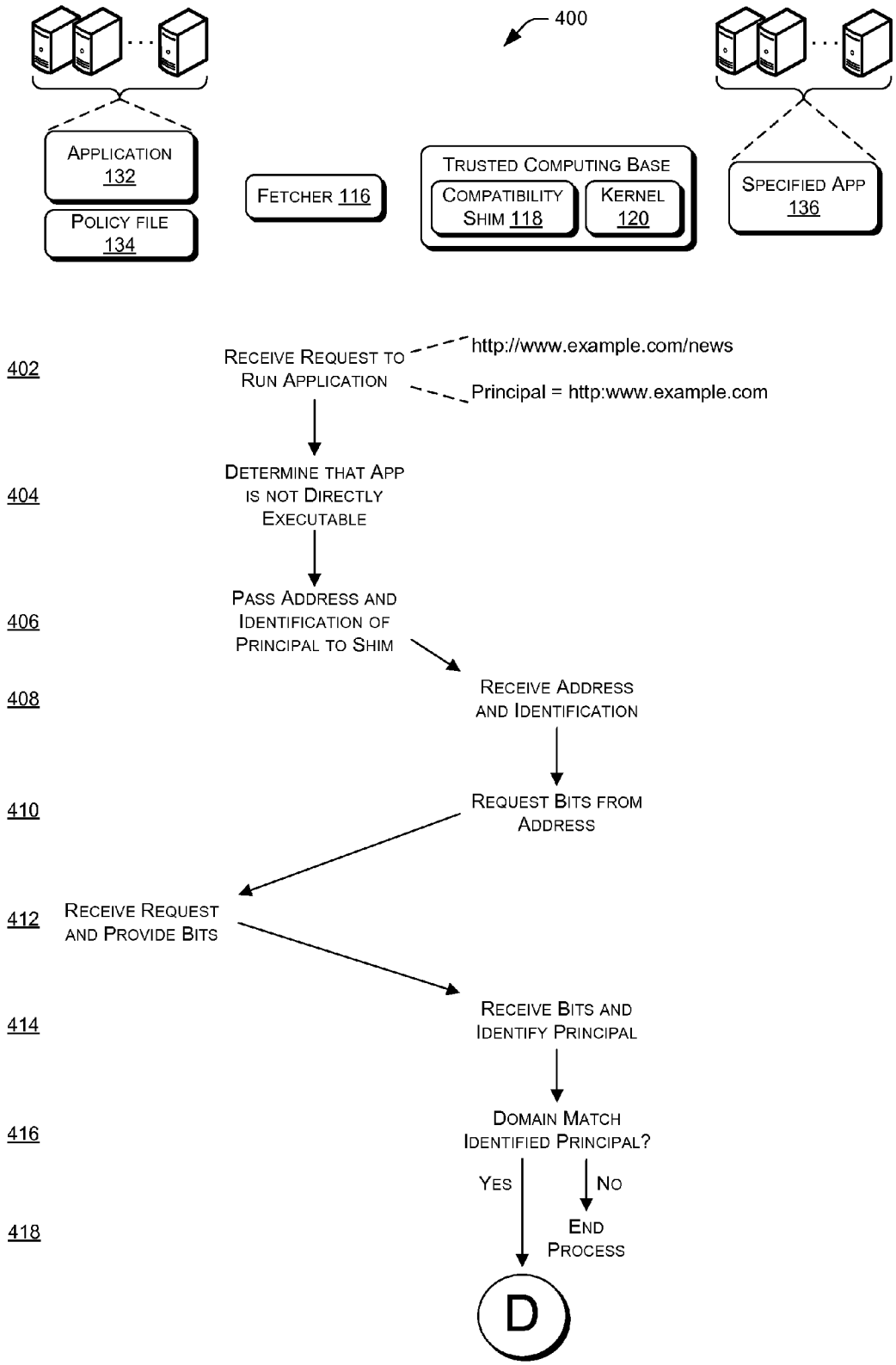
FIGS. 4A-4D collectively illustrate a flow diagram of an example process for executing an application that is not directly executable on the minimal execution environment that the client device of FIG. 1 provides. Here, the application specifies another application for providing the functionality that the minimal client device does not provide.
Figure 4B:
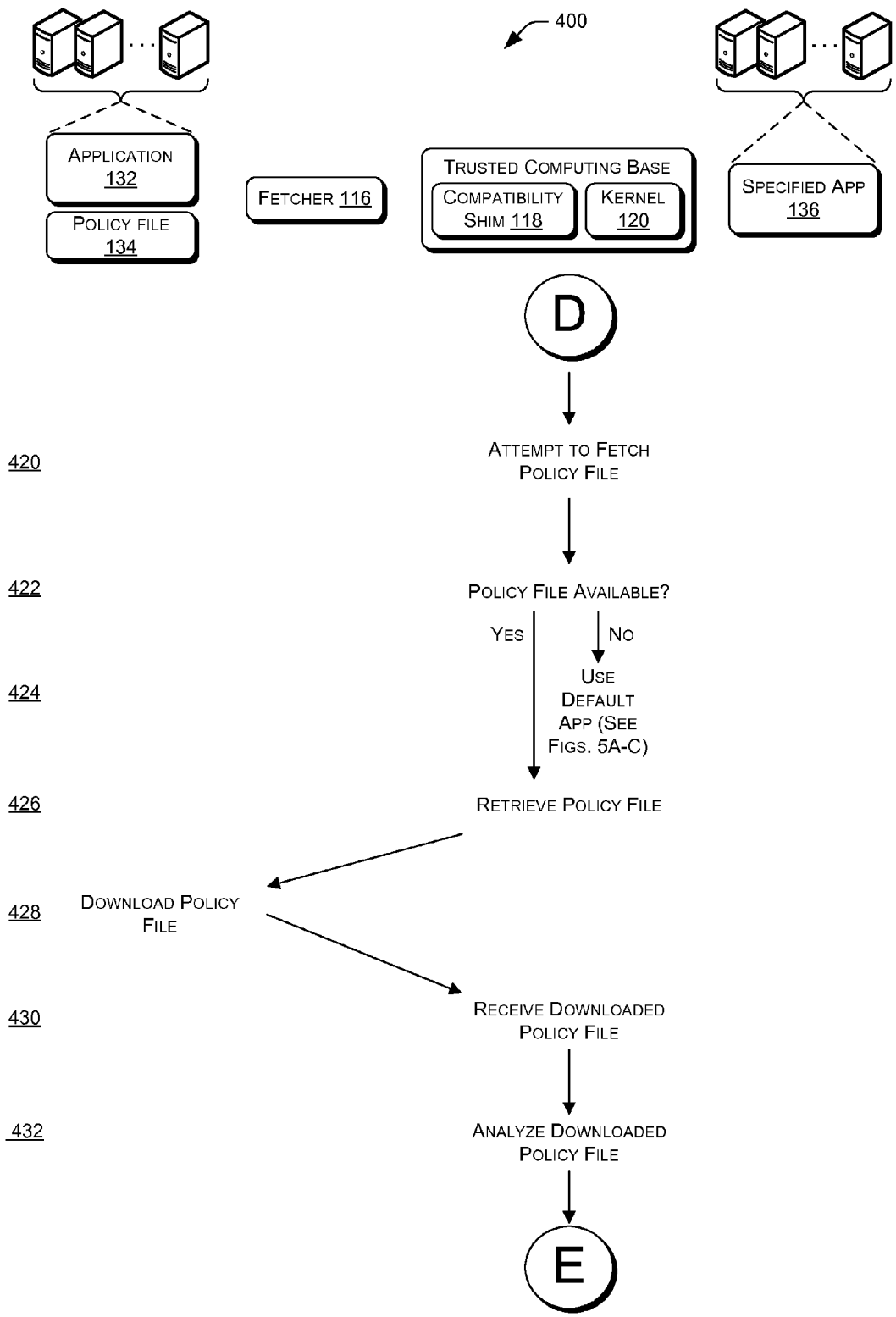
Figure 4C:
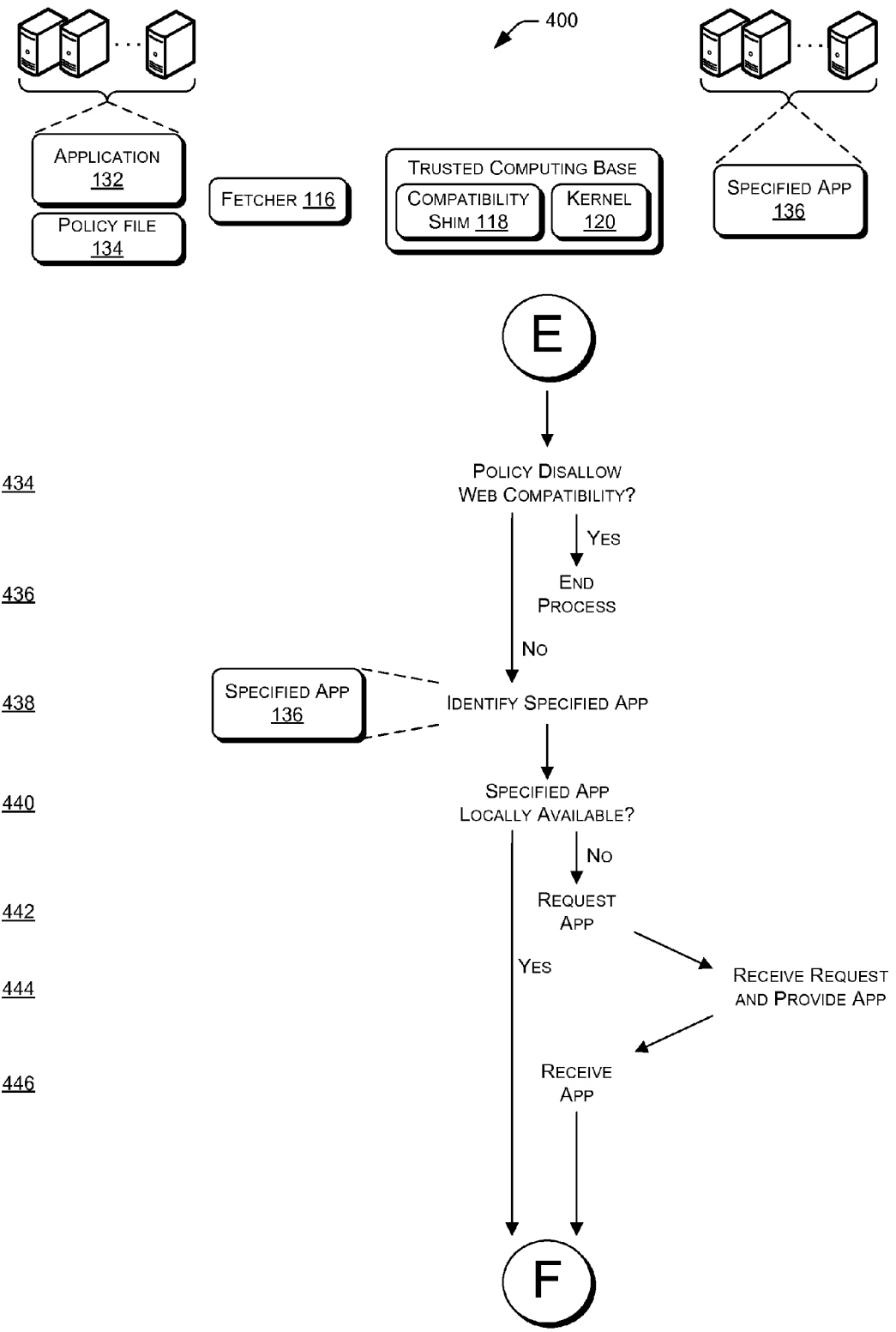
Figure 4D:
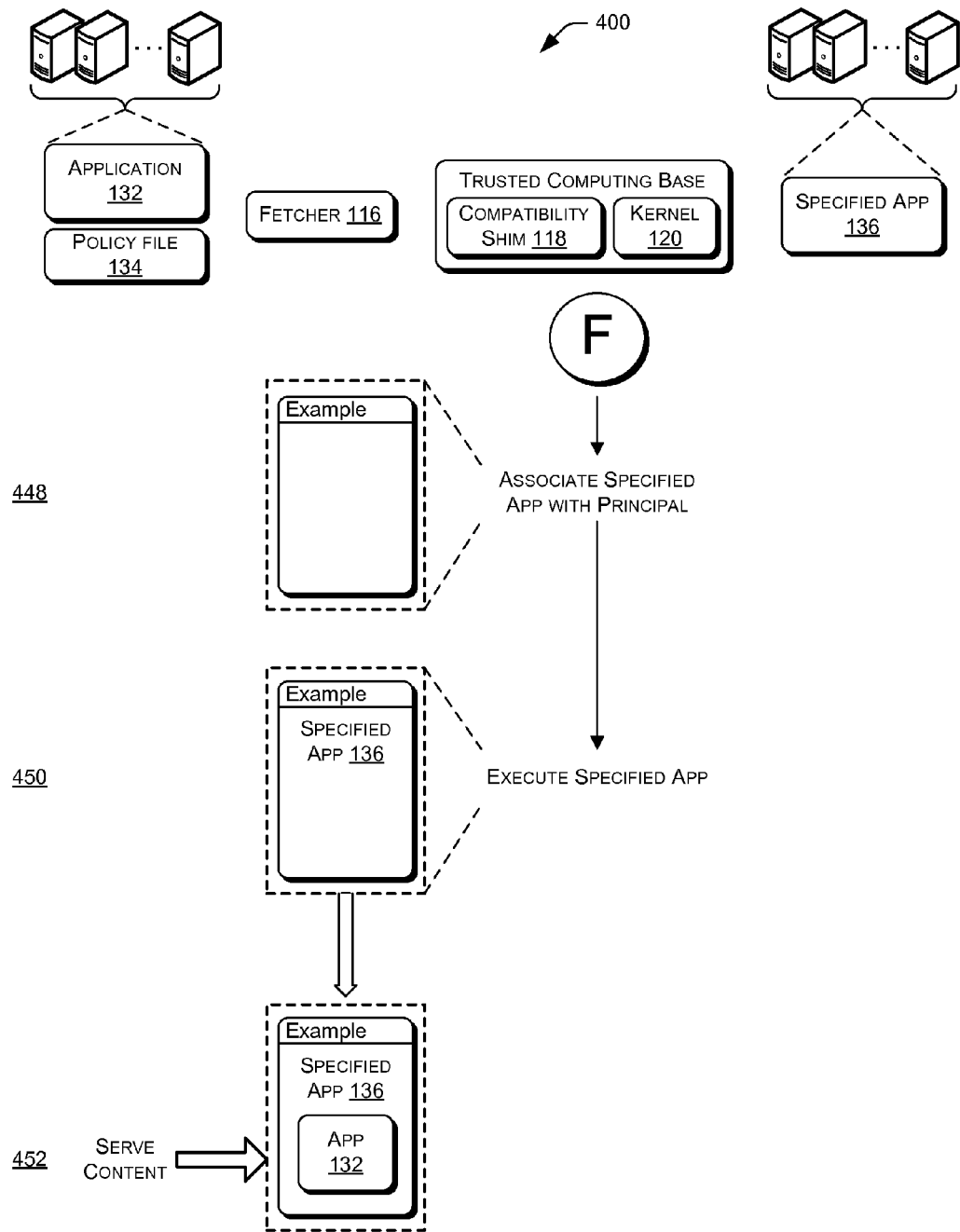

FIG. 4D continues the illustration of the process 400. At 448, the kernel component 120 associates the first application with the identified principal (e.g., by displaying the name of the principal in the chrome or other portion of the specified application). At 450, the kernel component executes the specified application 136, which in turn is able to pull in the content from the first application 132. At 452, the first application 132 is shown serving content, which is executed within the specified application, which in turn is executed within an isolated container provided by the computing device 104. As discussed above, however, the device 104 running the application 132 may additionally or alternatively request content from any other host or application on 104 via the network ports 124 as needed, given that the application is executing within its own isolated container.

Figure 5A:
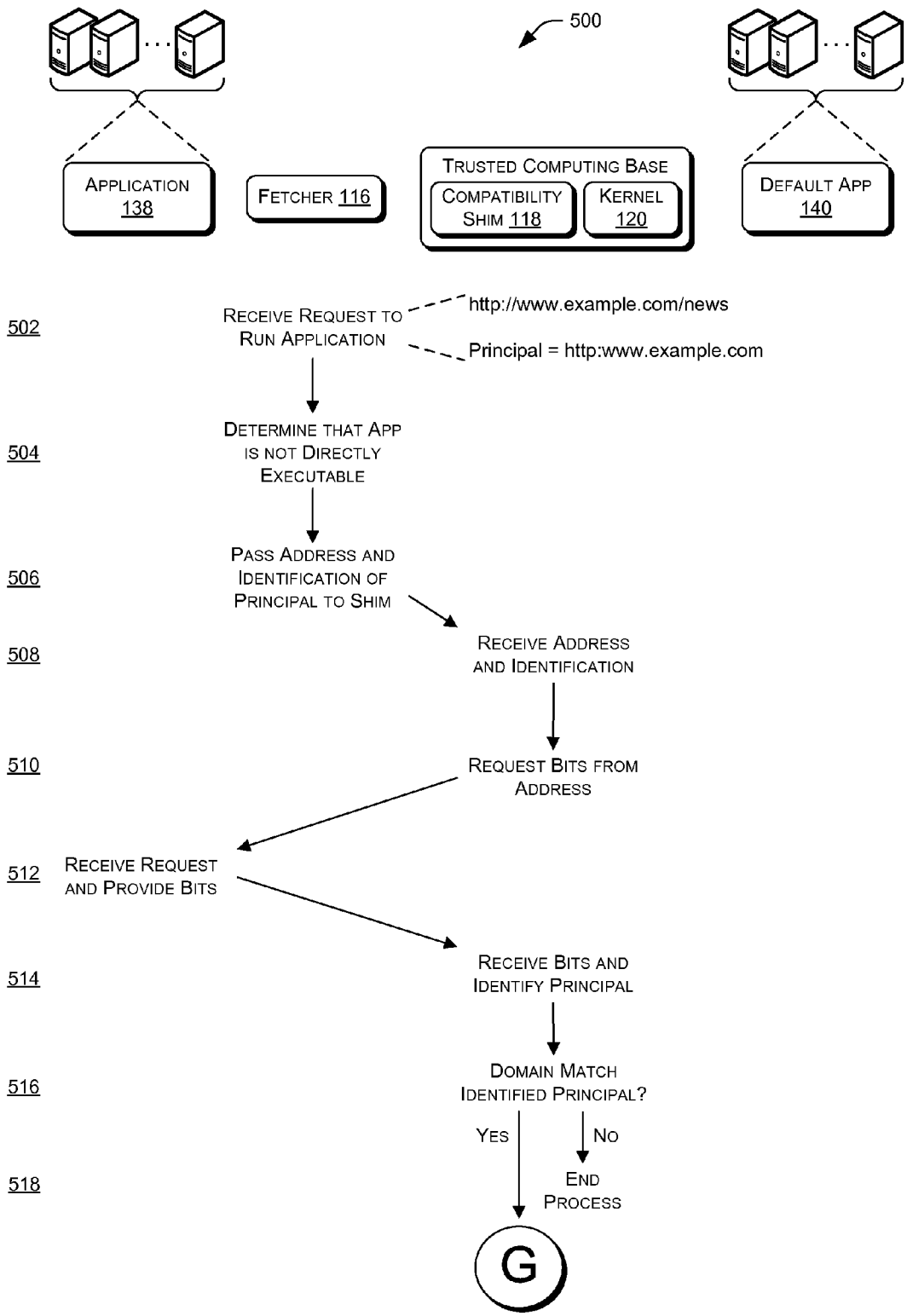
FIGS. 5A-5C collectively illustrate a flow diagram of another example process for executing an application that is not directly executable on the minimal execution environment that the client device of FIG. 1 provides. Here, the application does not specify another application for providing the functionality that the minimal client device does not provide.
Figure 5B:
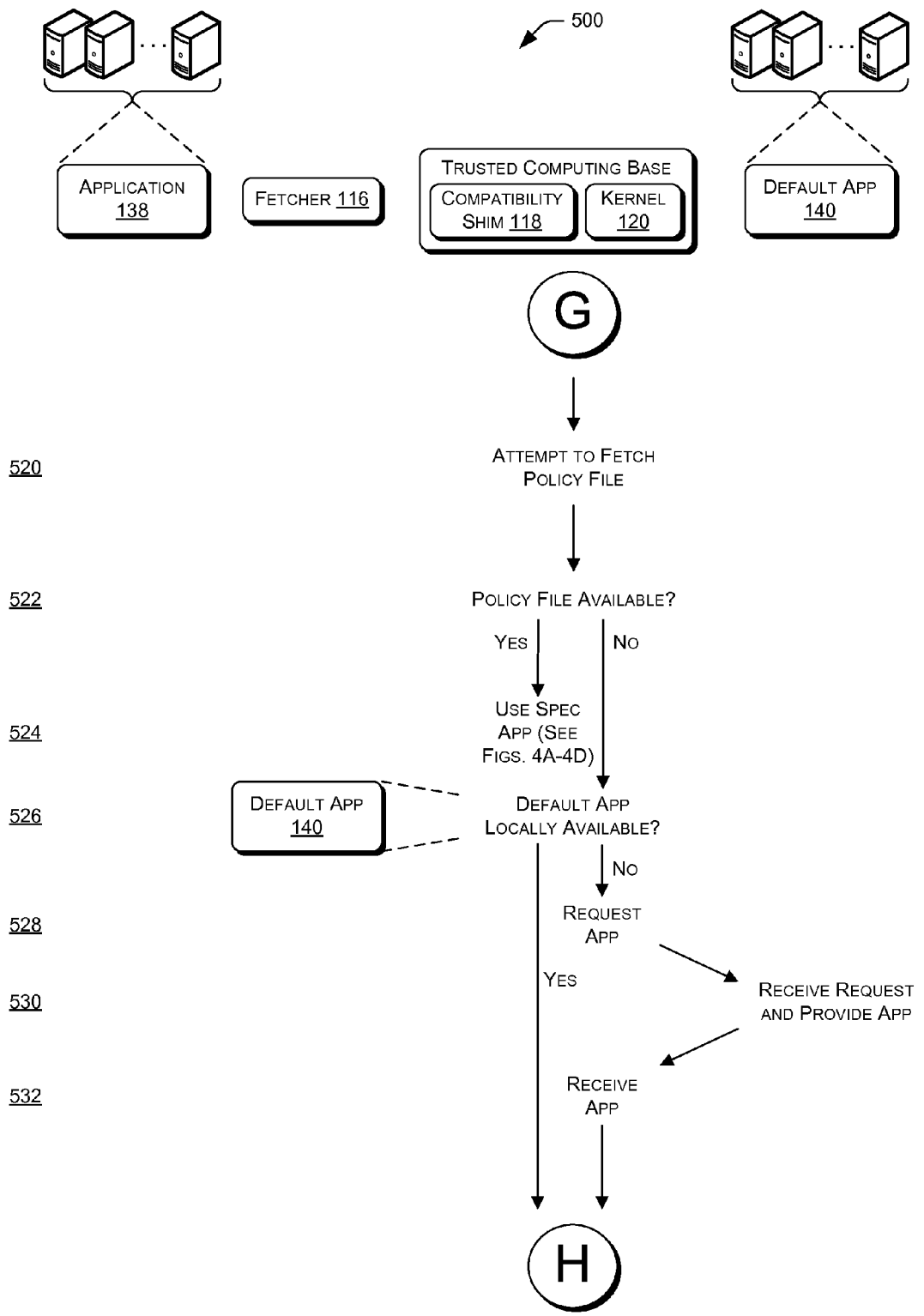
Figure 5C:
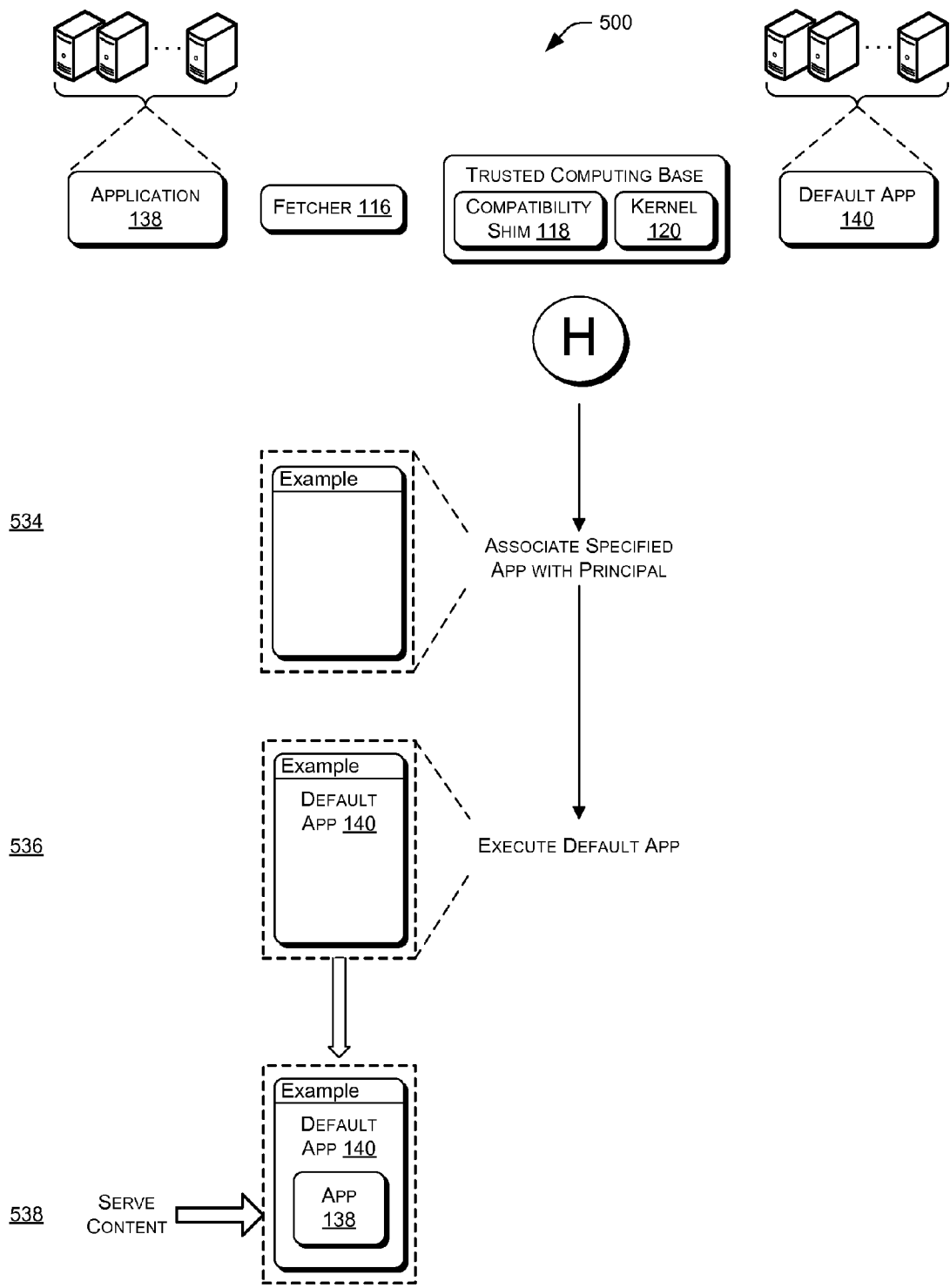

FIGS. 5A-5C collectively illustrate a flow diagram of another example process 500 for executing an application that is not directly executable on the minimal execution environment that the client device 104 provides. Here, the application does not specify another application for providing the functionality that the minimal client device does not provide. As such, the computing device 104 uses a default application for providing this functionality.

At 502, the fetcher 116 again receives a request to execute an application, such as the application 138 described above with reference to FIG. 1. For instance, the fetcher may receive a particular URL and an indication of the principal that is to be associated with the application. At 504, the fetcher 116 determines that this application utilizes certain system services that the computing device 104 does not natively provide and, hence, that the application is not directly executable on the device 104. Again, the fetcher 116 determines that the computing device 104 does not provide system services that, when combined with system services that the application provides, define a set of system services that are sufficient for rendering the application.

At 506, the fetcher 116 passes an address pointing to the application 138 and the identification of the principal to the trusted computing base and, namely, to the compatibility shim 118. At 508, the shim 118 receives the address and the identification. At 510, the shim 118 requests, from the address, bits to begin the process of running the application 138. At 512, the content provider hosting the application 138 receives the request and provides the bits. At 514, the shim 118 receives the bits and identifies the principal according to its understanding of the protocol used. At 516, the shim 118 determines whether the domain prefix matches the identified principal. If not, then the shim 118 aborts the process at 518.

If so, however, process 500 proceeds to FIG. 5B. Here, the shim attempts to fetch a policy file associated with the application 138 at 520. For instance, the shim 118 may look for a policy file having a pre-specified canonical name (e.g., "www.example.com/compatibility_policy.txt"). The shim 118 determines whether a policy file is available at 522. If the policy file is available and specifies a valid application, then the shim 118 uses the specified application at 524, as described above with reference to the example of FIG. 4. In the illustrated example, however, the application 138 is not associated with any policy file and, hence, the shim 118 is unable to locate a policy file.

As such, the shim 118 proceeds to utilize a pre-specified default application, such as the default application 140. At 526, the shim 118 determines whether this default application is locally available on the computing device. If not, then the shim 118 requests the default application 140 at 528. At 530, the content provider 106(N) hosting the specified application receives the request and provides the default application to the computing device 104. At 532, the computing device 104 receives the default application.

FIG. 5C continues the illustration of the process 500. At 534, the kernel component 120 associates the first application with the identified principal (e.g., by displaying the name of the principal in the chrome or other portion of the default application). At 536, the kernel component 120 executes the default application 140, which in turn is able to pull in the content from the first application 138. At 538, the first application 138 is shown serving content, which is executed within the default application, which in turn is executed within an isolated container provided by the computing device 104. As discussed above, however, the device 104 running the application 138 may additionally or alternatively request content from any other host or application on 104 via the network ports 124 as needed, given that the application is executing within its own isolated container.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage media storing computer-executable instructions that, when executed, cause one or more processors to perform acts comprising:
   receiving a request to execute a first application on a computing device;
   determining if the first application is directly executable on the computing device;
   executing the first application at least partly in response to determining that the first application is directly executable on the computing device; and
   at least partly in response to determining that the first application is not directly executable on the computing device:
      determining if the first application specifies a second application to be executed prior to executing the first application;
      executing the second application on the computing device at least partly in response to determining that the first application specifies the second application to be executed prior to executing the first application;
      executing a default application on the computing device at least partly in response to determining that the first application does not specify the second application to be executed prior to executing the first application; and
      executing library components to provide system services, wherein the library components execute inside an isolated container of the second application if the first application specified the second application, or an isolated container of the default application if the first application did not specify the second application.

2. The one or more computer-readable storage media as recited in claim 1, wherein:
   the computing device provides an isolated container for the first application to execute within, but lacks at least one system service used for executing the first application; and
   the first application is determined to be directly executable on the computing device when the first application provides each system service for executing the first application within the isolated container that the computing device does not provide.

3. The one or more computer-readable storage media as recited in claim 1, wherein the first application comprises a web application, and the second application and the default application comprise respective browser applications for executing the web application.

4. The one or more computer-readable storage media as recited in claim 1, the acts further comprising:
   at least partly in response to determining that the first application specifies the second application:

determining whether the second application is locally available to the computing device; and retrieving the second application when it is determined that the second application is not locally available;

and wherein the executing of the second application occurs at least partly in response to the retrieving.

5. The one or more computer-readable storage media as recited in claim 1, the acts further comprising associating the first application with a name of a principal indicating a protocol suite that started the first application.

6. The one or more computer-readable storage media as recited in claim 1, wherein the executing of the first application with the second application or the default application comprises executing the first application in compatibility mode, the acts further comprising:

at least partly in response to determining that the first application is not directly executable on the computing device:

determining if the first application includes an indication that it is not executable in the compatibility mode; and refraining from executing the first application in the compatibility mode at least partly in response to determining that the first application includes the indication.

7. A method comprising:

receiving, at a computing device, a request to execute a first application that utilizes one or more system services that the computing device does not natively provide;

determining, at least partly in response to the receiving of the request, whether the first application specifies a second application different from the first application to provide the one or more system services;

at least partly in response to determining that the first application specifies the second application different from the first application, executing the second application to provide the one or more system services utilized by the first application;

at least partly in response to determining that the first application does not specify the second application, executing a default application to provide the one or more system services utilized by the first application; and processing cross-application communication between at least the first application and the second application or between the default application and the first application within the computing device according to techniques for communication between the computing device and a remote host.

8. The method as recited in claim 7, wherein the one or more system services that the computing device does not natively provide include rendering stacks.

9. The method as recited in claim 7, wherein the first application comprises a web application and the second application and the default application comprise respective browsers.

10. The method as recited in claim 7, wherein the determining whether the first application specifies the second application to provide the one or more system services comprises:

attempting to locate a text file at a pre-specified address associated with the first application; and analyzing the text file to determine whether the first application specifies the second application at least partly in response to successfully locating the text file at the pre-specified address associated with the first application.

11. The method as recited in claim 7, further comprising:

determining whether the first application indicates that it does not run in compatibility mode; and refraining from causing execution of the first application via the second application or the default application at least partly in response to determining that the first application indicates that it does not run in the compatibility mode.

12. The method as recited in claim 7, wherein the executing of the second application or the default application comprises executing the second application or the default application within a container that isolates the second application or the default application, and the first application executing thereon, from other applications executing on the computing device.

13. The method as recited in claim 7, further comprising visibly indicating, as a part of the second application or the default application, a principal associated with the first application.

14. A computing device that does not natively provide sufficient system services for rendering web applications, the computing device comprising:

one or more processors;

memory; and a compatibility shim, stored in the memory and executable on the one or more processors, wherein the compatibility shim is operable to:

determine when a web application to be executed at the computing device does not include a set of system services that is sufficient for rendering the web application in combination with services provided by the computing device;

locate a policy file within a plurality of content providers to identify a second application to be executed before execution of the web application; and locate the second application identified by the policy file, wherein the second application provides at least a portion of the set of system services that is sufficient for rendering the web application at the computing device and wherein the web application specifies the second application identified in the policy file.

15. The computing device as recited in claim 14, wherein the set of system services that is sufficient for rendering the web application includes rendering stacks, libraries, plug-ins, a JavaScript engine, or a multimedia platform for adding animation, video, or interactivity to the web application.

16. The computing device as recited in claim 14, wherein the computing device executes the second application that provides the at least a portion of the set of system services for rendering the web application in a container that is isolated from other applications running on the computing device, and wherein the web application executes the second application that provides the at least a portion of the set of system services within the container.

17. The computing device as recited in claim 14, wherein the second application that provides the at least a portion of the set of system services comprises a web browser.

18. The computing device as recited in claim 14, wherein the compatibility shim is executable to locate the second application that provides the at least a portion of the set of system services by:

determining whether the web application specifies a particular application for providing one or more system services;

at least partly in response to determining that the web application specifies the particular application for providing the one or more system services:

determining whether the particular application is available locally on the computing device; and retrieving the particular application at least partly in response to determining that the particular application is not locally available on the computing device.

19. The computing device as recited in claim 18, wherein the determining whether the web application specifies the particular application for providing the one or more system services comprises attempting to locate a file having a canonical name at a host of the web application.

20. The computing device as recited in claim 14, wherein the compatibility shim is executable to locate the second application that provides the at least a portion of the set of system services by:

determining whether the web application specifies a particular application for providing one or more system services; and at least partly in response to determining that the web application does not specify the particular application for providing the one or more system services, executing a default application for providing the set of system services.

* * * * *